US010739237B2

(12) United States Patent
Ingber

(10) Patent No.: US 10,739,237 B2
(45) Date of Patent: Aug. 11, 2020

(54) PROCESSOR FILTER ARRANGEMENT THAT INCLUDES METHOD AND APPARATUS TO REMOVE WASTE FLUID THROUGH A FILTER

(71) Applicant: Pocared Diagnostics Ltd., Omer (IL)

(72) Inventor: Gal Ingber, Oranit, IL (US)

(73) Assignee: POCARED Diagnostics LTD., Rehovot (IL)

(*) Notice: Subject to any disclaimer, the term of this patent is extended or adjusted under 35 U.S.C. 154(b) by 98 days.

(21) Appl. No.: 16/052,969

(22) Filed: Aug. 2, 2018

(65) Prior Publication Data

US 2019/0041307 A1 Feb. 7, 2019

Related U.S. Application Data

(60) Provisional application No. 62/540,357, filed on Aug. 2, 2017, provisional application No. 62/547,359, filed on Aug. 18, 2017.

(51) Int. Cl.
*G01N 1/40* (2006.01)
*B01D 29/50* (2006.01)
(Continued)

(52) U.S. Cl.
CPC .......... *G01N 1/4077* (2013.01); *B01D 29/50* (2013.01); *B01D 29/66* (2013.01); *B01L 3/5085* (2013.01);
(Continued)

(58) Field of Classification Search
CPC .... G01N 1/4077; G01N 21/03; G01N 35/025; G01N 2001/4088; G01N 2021/0357;
(Continued)

(56) References Cited

U.S. PATENT DOCUMENTS 3,754,868 A 8/1973 Witz et al.
4,096,062 A 6/1978 Myreen et al.
(Continued)

FOREIGN PATENT DOCUMENTS

EP 1179585 A2 2/2002
EP 2645078 A1 10/2013
(Continued)

OTHER PUBLICATIONS

Bourbeau et al, "1. First Evaluation of the WASP, a New Automated Microbiology Plating Instrument", J. Clin. Microbiol., 2009, pp. 1101-1106, vol. 47(4).
(Continued)

*Primary Examiner* — Jamil Ahmed
(74) *Attorney, Agent, or Firm* — The Webb Law Firm

(57) ABSTRACT

An apparatus for processing a biological sample for optical analysis having a cartridge with a sample supply container and a couvette, a cartridge/magazine holding the cartridge, and a cassette fan positioned over the cartridge. A filter cassette is mounted within the cassette fan, wherein the filter cassette has an inlet for receiving a sample from the sample supply container, an outlet for discharging the filter sample into the couvette, and valves therein to manipulate the sample for filtering. A cassette clamp is positioned over the filter cassette to secure the cassette and operate the filter cassette. A method for implementing this apparatus is also described herein. Additionally an apparatus is used for and a method measures waste fluid that passes over a filter element to control the amount of rinse fluid passing over the filter element.

20 Claims, 35 Drawing Sheets

(51) Int. Cl.
  *B01D 29/66* (2006.01)
  *B01L 3/00* (2006.01)
  *G01N 21/03* (2006.01)
  *G01N 35/02* (2006.01)
  *G01N 35/00* (2006.01)
  *G01N 35/04* (2006.01)

(52) U.S. Cl.
  CPC ........... *G01N 21/03* (2013.01); *G01N 35/025* (2013.01); *B01L 2200/025* (2013.01); *B01L 2200/028* (2013.01); *B01L 2300/0681* (2013.01); *G01N 2001/4088* (2013.01); *G01N 2021/0357* (2013.01); *G01N 2035/00089* (2013.01); *G01N 2035/00475* (2013.01); *G01N 2035/0437* (2013.01); *G01N 2035/0465* (2013.01)

(58) Field of Classification Search
  CPC .......... G01N 2035/00089; G01N 2035/00475; G01N 2035/0437; G01N 2035/0465; B01D 29/50; B01D 29/66; B01L 3/5085; B01L 2200/025; B01L 2200/028; B01L 2300/0681
  See application file for complete search history.

(56) References Cited

U.S. PATENT DOCUMENTS

| | | |
|---|---|---|
| 4,427,415 A | 1/1984 | Cleveland |
| 5,180,606 A | 1/1993 | Stokes et al. |
| 5,375,477 A | 12/1994 | Neill et al. |
| 5,380,437 A | 1/1995 | Bertoncini |
| 5,603,900 A | 2/1997 | Clark et al. |
| 5,683,658 A | 11/1997 | Reischl et al. |
| 5,947,689 A | 9/1999 | Schick |
| 5,976,824 A | 11/1999 | Gordon |
| 6,338,802 B1 | 1/2002 | Bodner et al. |
| 6,692,702 B1 | 2/2004 | Burshteyn et al. |
| 6,949,355 B2 | 9/2005 | Yamanishi et al. |
| 7,100,461 B2 | 9/2006 | Bradley et al. |
| 7,240,572 B2 | 7/2007 | Pitt et al. |
| 7,374,724 B2 | 5/2008 | Igenhoven et al. |
| 7,510,654 B2 | 3/2009 | Mir et al. |
| 7,682,511 B2 | 3/2010 | de los Reyes et al. |
| 7,695,627 B2 | 4/2010 | Bosch et al. |
| 8,007,743 B2 | 8/2011 | Clark et al. |
| 8,033,187 B2 | 10/2011 | Senn et al. |
| 8,110,112 B2 | 2/2012 | Alburty et al. |
| 8,584,535 B2 | 11/2013 | Page et al. |
| 8,584,536 B2 | 11/2013 | Page et al. |
| 8,804,114 B2 | 8/2014 | Ingber |
| 9,506,866 B2 | 11/2016 | Ingber et al. |
| 2002/0030015 A1 | 3/2002 | Stipanovic et al. |
| 2002/0042125 A1 | 4/2002 | Petersen et al. |
| 2002/0045243 A1 | 4/2002 | Laska et al. |
| 2004/0026322 A1 | 2/2004 | Nussbaumer et al. |
| 2004/0132198 A1 | 7/2004 | Burshteyn et al. |
| 2004/0132208 A1 | 7/2004 | Burshteyn et al. |
| 2005/0173315 A1 | 8/2005 | Bosch et al. |
| 2008/0023381 A1 | 1/2008 | Jackson et al. |
| 2008/0237142 A1 | 10/2008 | Carpenter et al. |
| 2009/0101575 A1 | 4/2009 | Alburty et al. |
| 2009/0126514 A1 | 5/2009 | Burroughs et al. |
| 2009/0217777 A1 | 9/2009 | Hanson et al. |
| 2009/0277833 A1 | 11/2009 | Mir et al. |
| 2009/0280565 A1 | 11/2009 | Jolicoeur et al. |
| 2010/0051527 A1 | 3/2010 | Frandsen |
| 2010/0068706 A1 | 3/2010 | Pourahmadi et al. |
| 2010/0139415 A1* | 6/2010 | Berger .................. G01F 1/667 73/861.28 |
| 2010/0313685 A1 | 12/2010 | Page et al. |
| 2010/0313686 A1 | 12/2010 | Page et al. |
| 2011/0061474 A1 | 3/2011 | Page et al. |
| 2011/0108483 A1 | 5/2011 | Kaas |
| 2011/0197685 A1 | 8/2011 | Alburty et al. |
| 2012/0156716 A1 | 6/2012 | Walsh et al. |
| 2013/0045532 A1 | 2/2013 | Hyman et al. |
| 2013/0059326 A1 | 3/2013 | Waiche et al. |
| 2013/0086980 A1 | 4/2013 | Gadini et al. |
| 2013/0315780 A1 | 11/2013 | Cook et al. |
| 2014/0246389 A1 | 9/2014 | Ingber |
| 2015/0041375 A1 | 2/2015 | Oranth et al. |
| 2015/0151253 A1* | 6/2015 | Gurfinkel .......... B01L 3/502753 210/636 |

FOREIGN PATENT DOCUMENTS

| | | |
|---|---|---|
| GB | 2531616 A | 4/2016 |
| WO | 2008151093 A1 | 12/2008 |
| WO | 2013173524 A2 | 11/2013 |
| WO | 2014123896 A1 | 8/2014 |

OTHER PUBLICATIONS

Copan Diagnostics, Inc., "WASP®: General Information", Copan WASP.

Copan Diagnostics, Inc., "WASP™ Walk Away Specimen Processor", Copan.

Kim et al, "A Rapid and Economic In-House DNA Purification Method Using Glass Syringe Filters", PLoS One, 2009, pp. 1-7, vol. 4(11).

Nih, "What Goes in Chemical Waste Containers", 2017, pp. 1-2.

Tanny et al, "Improved Filtration Technique for Concentrating and Harvesting Bacteria", Applied and Environmental Microbiology, 1980, vol. 40(2), pp. 269-273.

Zierdt, "Adherence of Bacteria, Yeast, Blood Cells, and Latex Spheres to Large-Porosity Membrane Filters", Applied and Environmental Microbiology, 1979, vol. 38(6), pp. 1166-1172.

* cited by examiner

PROCESSOR FILTER ARRANGEMENT THAT INCLUDES METHOD AND APPARATUS TO REMOVE WASTE FLUID THROUGH A FILTER

CROSS REFERENCE TO RELATED APPLICATIONS

This application claims the benefit of United States Provisional Application Nos. 62/540,357 filed Aug. 2, 2017 and 62/547,359 filed Aug. 18, 2017. The disclosure of each of these documents is hereby incorporated in its entirety by reference.

BACKGROUND OF THE INVENTION

Field of the Invention

The present invention relates to a system and process for conducting the identification and quantification of microorganisms, such as bacteria found in biological samples and for an apparatus and method for determining when a rinse cycle for filters used in the system may be terminated.

Description of Related Art

In general, current practice for identifying microorganisms involves a complex, lengthy, and expensive process for identifying and specifying microorganisms in microbiology labs. As illustrated in FIG. 1, a biological sample suspended in fluid is provided in a container 1. The sample is processed to concentrate the particles in a solution 2 and, thereafter, an optical analysis is performed on the particles in the solution to identify the particles 3. U.S. Pat. No. 8,804,114 (hereinafter "the '114 patent") is assigned to the present Applicant, and hereby incorporated in its entirety by reference, discloses a system for performing this procedure.

FIGS. 2-4 of the present application are figures from the '114 patent. For clarity, the reference numerals from that patent have been removed in favor of the reference numerals found in the present figures discussed. FIGS. 2-4 illustrate a prior art system 10, whereby a magazine 12 contains a plurality of cartridges 13, each containing a pipette tip 15, sample supply container 16, and a couvette 18 which as illustrated may be an optics cup. The sample supply container 16 contains a biological sample. The sample is extracted from the container 16 using the pipette tip 15 and, thereafter, subjected to a centrifuge 20 where the particles are concentrated and, thereafter, deposited using the same or another pipette tip 15, in the couvette 18 for optical analysis.

While the arrangement in FIGS. 2-4 may be used to identify and quantify microorganisms, a system is need to process microorganisms in a more efficient manner for such identification and quantification.

United States Patent Application Publication No. 2015/0151253 (hereinafter "the '253 application") is assigned to the present Applicant, and is hereby incorporated in its entirety by reference. Figures from the '253 application have been included as FIGS. 6 and 7 and reference numerals have been removed in favor of reference numerals found and discussed in the present application.

FIG. 6 illustrates a filter cassette 25 having a sample inlet 27 and a concentrated particle outlet 30. The filter cassette 25 includes two separate filters 35A, 35B that are used for filtering of the particles as described in the '253 application. Multiple ports 40A, 40B, 40C, and 40D are provided to supply elution fluid used for the tangential flow of elution fluid over the filters, along with rinse fluid and suction, to achieve the filtering process as described in the '253 application.

Briefly stated, a fluid/particle mixture is introduced through the sample inlet 27 and deposited upon the upper surface of a first filter 35A of a filter cassette 25. A rinse fluid is introduced through port 40B and passed through the filter 35A to rinse undersize particles from the upper surface of the filter 35A. Thereafter, an elution fluid is introduced though port 40B to tangentially wipe particles from the upper surface of the filter 35A. These particles are then deposited upon the upper surface of a second filter 35B within the cassette 25. A rinse fluid is introduced through port 40C and passed through the filter 35B to rinse undersize particles from the upper surface of the filter 35B. Thereafter, an elution fluid is introduced though port 40C to tangentially wipe particles from the upper surface of the second filter 35B and the filtering process is ended.

Of particular interest in this process is the proper dosage of rinse fluid through the filters. Depending upon the particles retained by each filter, the filters may clog to varying degrees thereby limiting the amount of rinse fluid that may pass through. Because of this, the flow volume through the filters cannot be measured based upon the time of flow, but must be based upon the volume of fluid that has passed through the filters.

FIG. 6 illustrates a slide valve 42 of the cassette 25 with slots 44, therein, for implementing the multiple steps utilized during the filtering of a sample through the filter cassette 25.

An apparatus and method are needed for processing a biological sample for optical analysis utilizing these filter cassettes. Also, an apparatus and method are needed for properly dosing the rinse fluid over each of the filters.

SUMMARY OF THE INVENTION

In one embodiment, a system for processing a biological sample for optical analysis has a plurality of cartridges, wherein each cartridge has a sample supply container for receiving a fluid/particle mixture and each cartridge has a couvette for receiving particles filtered from the fluid/particle mixture. The system has a cartridge magazine with receivers for holding the plurality of cartridges and a cassette fan having a plurality of slots extending therethrough with each slot adapted to hold a filter cassette, wherein the cassette fan is movable from a first position aligned with select cartridges to a second position away from the cartridges. The system further has a cassette clamp positioned over the cassette fan adapted to secure each filter cassette within the fan and to operate the filter cassette.

In another embodiment, a method for processing a biological sample for optical analysis comprises the step of holding a plurality of cartridges within receivers of a cartridge magazine, wherein each cartridge has a sample supply container for receiving a fluid/particle mixture and each cartridge has a couvette for receiving particles filtered from the fluid/particle mixture. With a cassette fan having a plurality of slots extending therethrough with each slot adapted to hold a filter cassette, the cassette fan is moved to a first position aligned with select cartridges in the magazine. A cassette clamp is positioned over the cassette fan and secures with the cassette clamp each filter cassette within the fan and operating the filter cassette.

In yet another embodiment is directed to an apparatus for rinsing undersize particles through a filter element comprising an upper surface of the filter element upon which particles are deposited and a source of rinse fluid for providing rinse fluid through the upper surface of the filter element to displace undersize particles through the filter element; wherein thereafter the used rinse fluid becomes waste fluid. A vessel is in fluid connection with the filter element for collecting the waste fluid. A measuring device measures the amount of waste fluid in the vessel and upon reaching a predetermined amount of waste fluid, discontinues the rinsing process. A source of elution fluid is in fluid communication with the upper surface of the filter element for tangentially wiping particles from the filter.

In still another embodiment is directed to a method using a filter element wherein the method is for dosing an amount of elution fluid for tangential wiping particles from the filter element comprising the steps of:

a) depositing particles upon an upper surface of the filter element;
b) providing rinse fluid through the upper surface of the filter element to displace undersize particles through the filter element; wherein thereafter the used rinse fluid becomes waste fluid;
c) collecting the waste fluid in a vessel;
d) measuring the amount of waste fluid in the vessel and upon reaching a predetermined amount of waste fluid, discontinuing the rinsing; and
e) if the amount of waste fluid in the vessel is less than the predetermined amount of waste fluid, then repeat steps b)-d).

BRIEF DESCRIPTION OF THE DRAWINGS

Some of the advantages and features of the preferred embodiment of the invention have been summarized herein above. These embodiments, along with other potential embodiments of the device and method, will become apparent to those skilled in the art when referencing the following drawings in conjunction with the detailed description as they relate to the figures.

DESCRIPTION OF THE INVENTION

For purposes of the description hereinafter, spatial orientation terms, if used, shall relate to the referenced embodiment as it is orientated in the accompanying drawing figures or otherwise described in the following detailed description. However, it is to be understood that the embodiment described hereinafter may assume many alternate variations and embodiments. It is also to be understood that the specific devices illustrated in the accompanying drawing figures and described herein are exemplary and should be considered as limiting.

Figure 2:
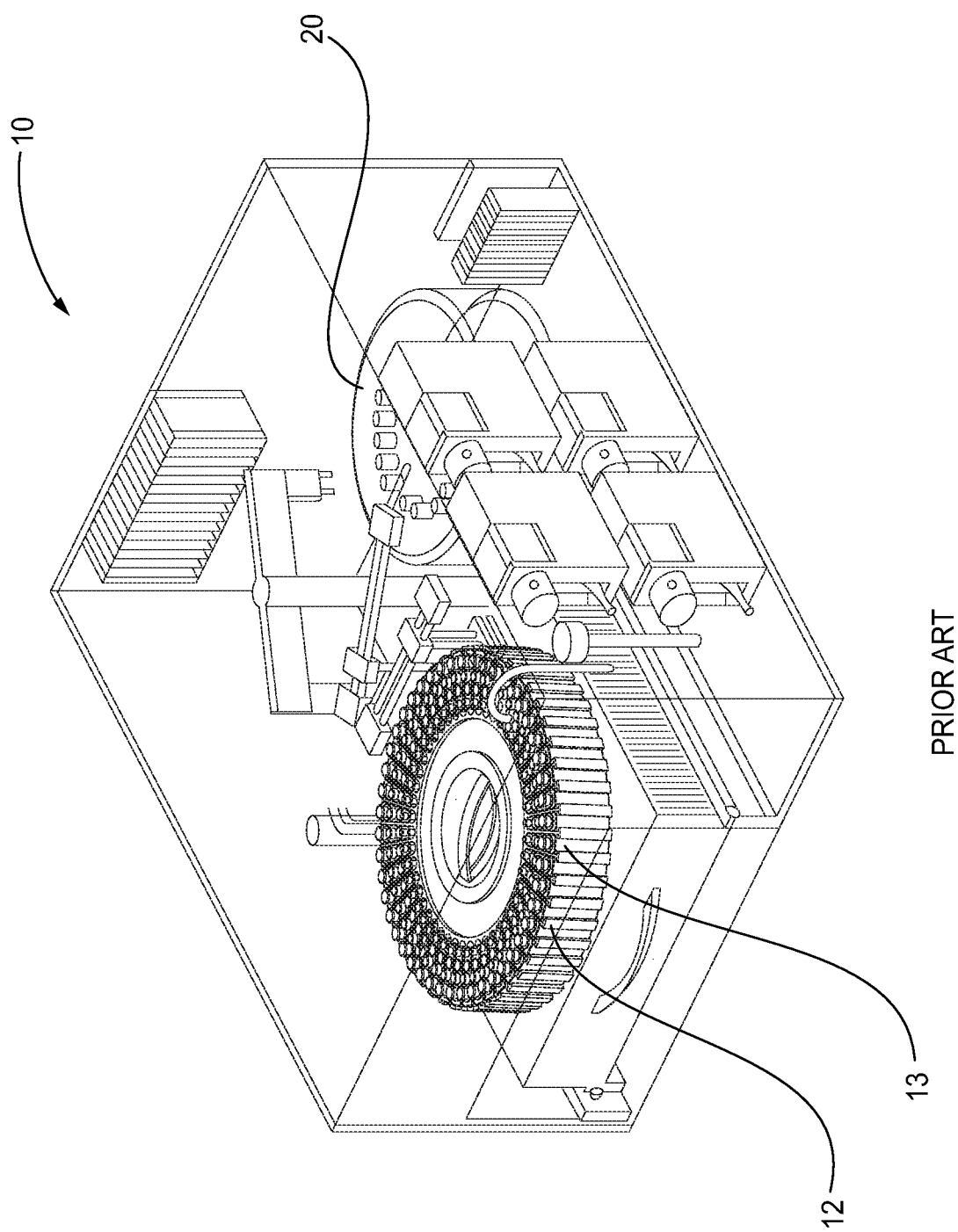
FIG. 2 illustrates a prior art system for processing a biological sample for analysis using a centrifuge.
Figure 5:
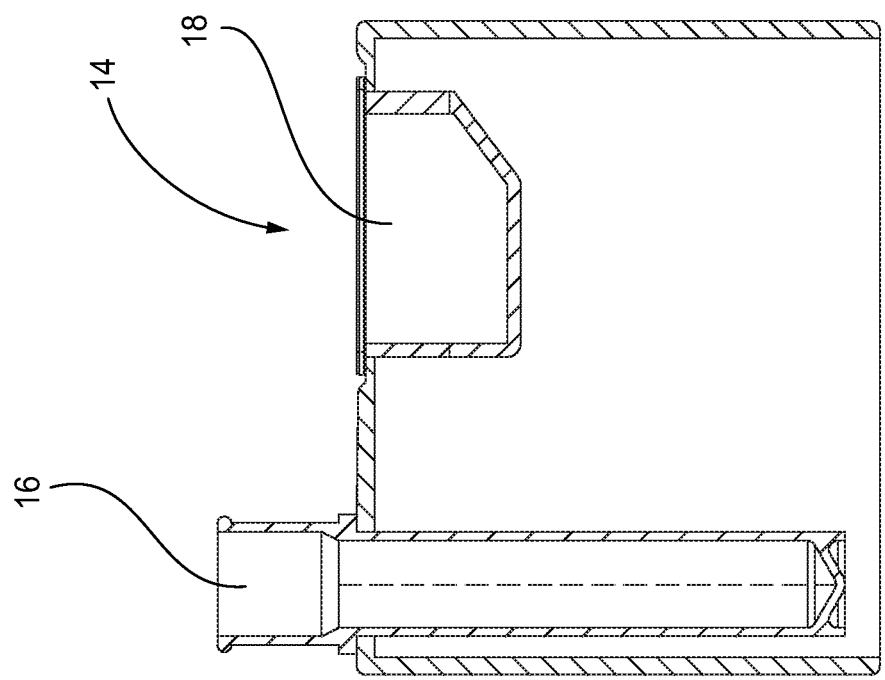
FIG. 5 illustrates a cross section of a cartridge that will be utilized in the present invention.
Figure 6:
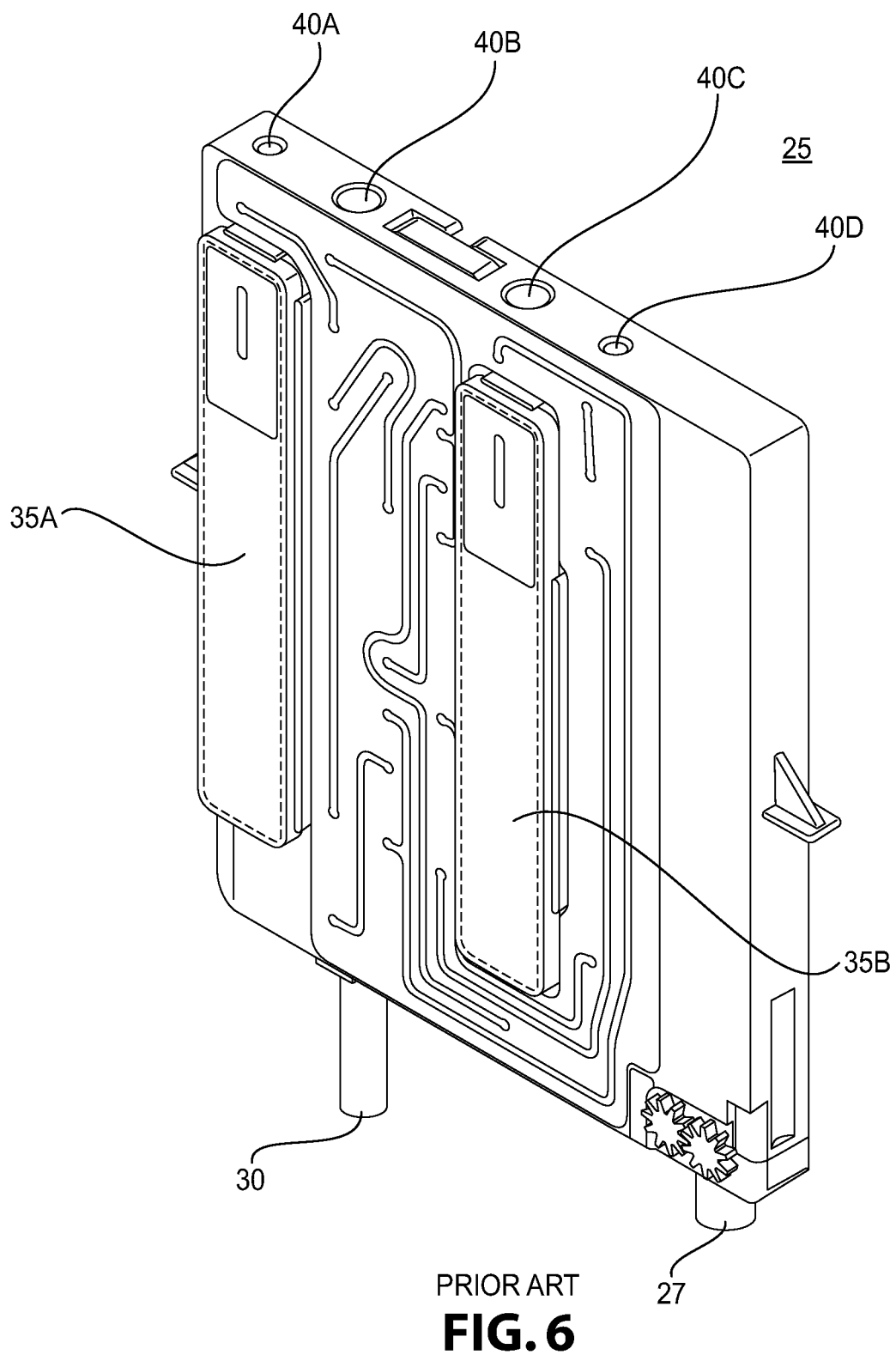
FIG. 6 illustrates a prior art filter cassette used in place of the centrifuge for providing concentrated biological particles in a fluid.
Figure 7:
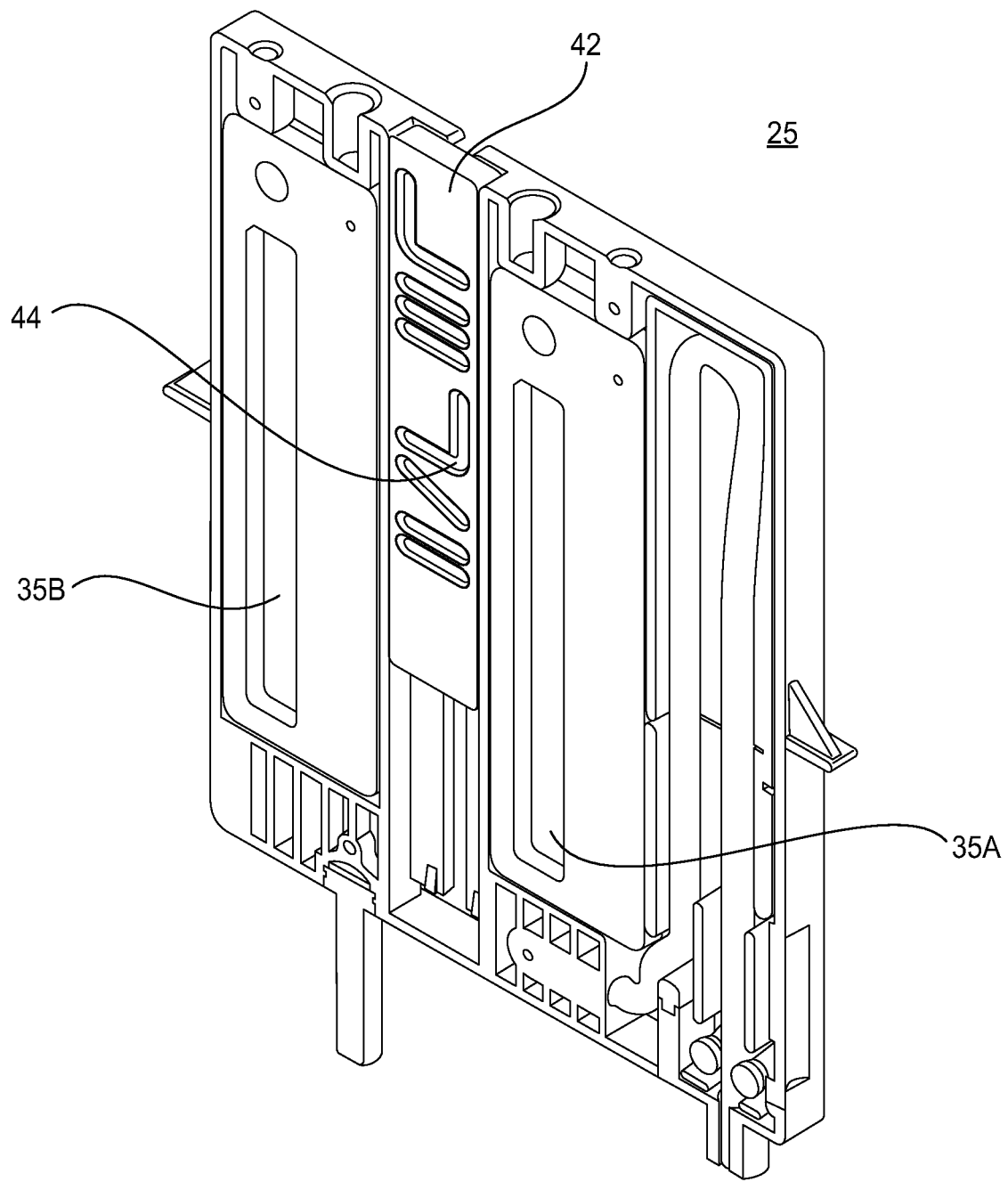
FIG. 7 is the prior art filter cassette in FIG. 6 in section view to show a slider valve.

While FIG. 2 illustrates a system for concentrating particles using a centrifuge and, thereafter, subjecting the particles to optical analysis, the subject invention is directed to the manner by which particles are concentrated utilizing the prior art filter cassette 25 illustrated in FIGS. 6-7. FIG. 5 shows a cross-sectional view of a cartridge 14 that may be used in the system of the present invention. The cartridge 14 is similar to the cartridge 13 shown in FIGS. 3-4. However, the cartridge 14 in FIG. 5 includes only a sample supply container 16 and a couvette 18. In the system according to the present invention, there is no need for a pipette tip. The design of the filter cassette 25 allows multiple filter cassettes 25 to be operated simultaneously using multiple cartridges 14 mounted within a magazine 12.

In particular, FIGS. 8A-8D are sketches illustrating the process by which multiple cartridges 14A-14H mounted within the magazine 12 are processed. The cartridge 14/magazine 12 together will be referred to as the cartridge/magazine assembly 17. For convenience, while the cartridges 14 are identical to one another, to better define the positional relationship of each cartridge 14 in the foregoing processes, the cartridges herein will be referred to as 14A-14Q with the understanding that the magazine 12 is not limited to sixteen cartridges. A single cartridge magazine 12 may, for example, hold forty cartridges 14.

Figure 8A:
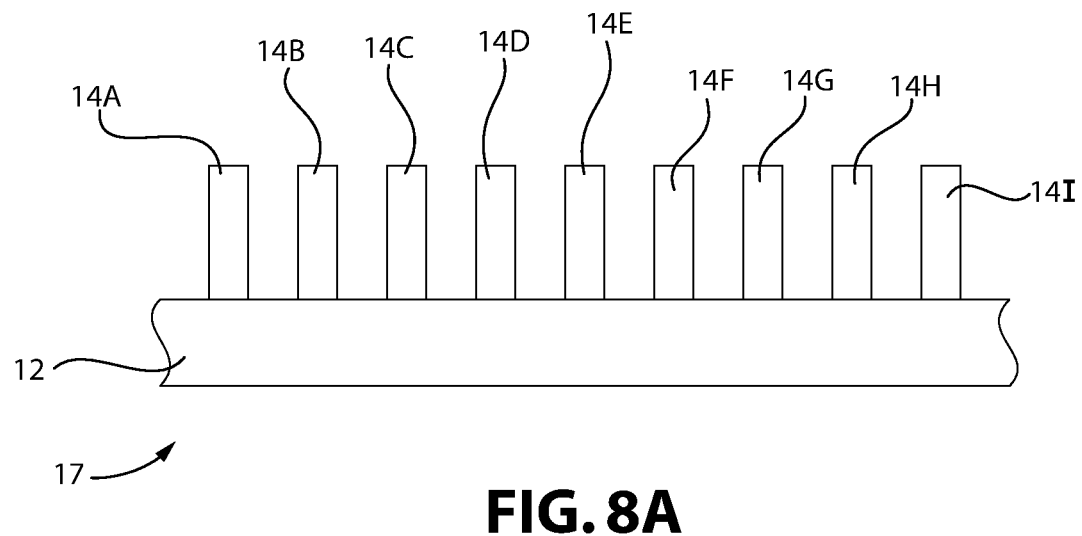
FIGS. 8A-8D are sketches illustrating the steps by which a sample is processed in accordance with the subject invention.
Figure 8B:
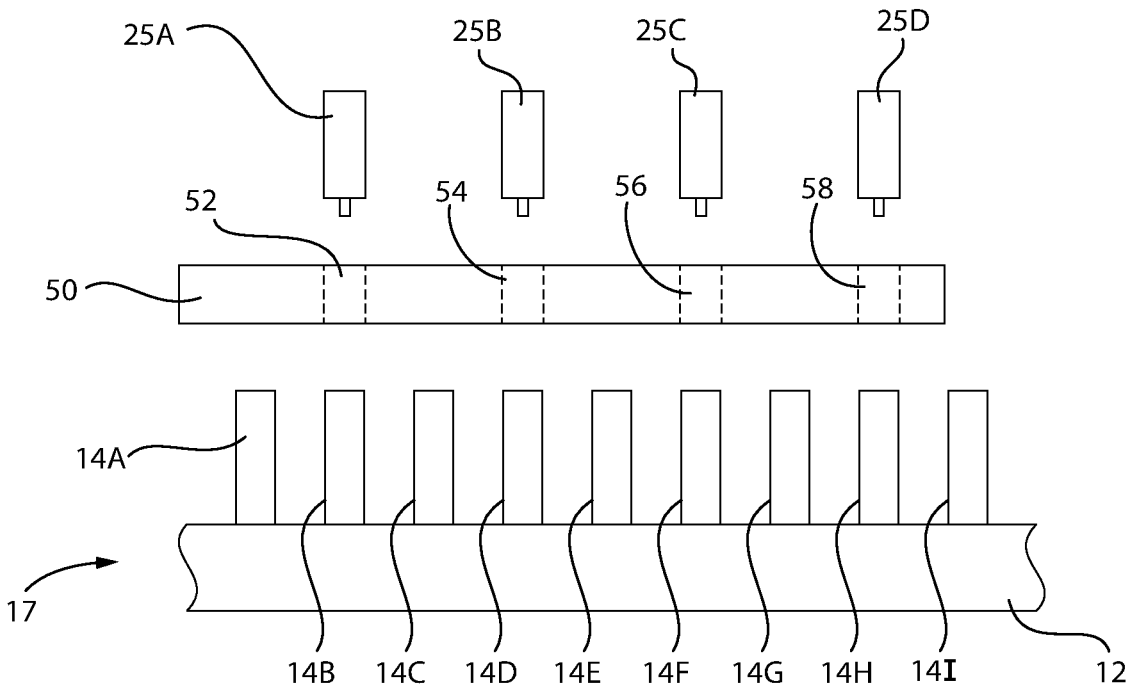

Directing attention to FIG. 8B, a cassette fan 50 is positioned proximate to the cartridge/magazine assembly 17. Slots 52, 54, 56, 58 extend through the fan 50. The filter cassettes 25A-25D are mounted within the slots 52, 54, 56, 58 of the fan 50 as in FIG. 8C.

Figure 8C:
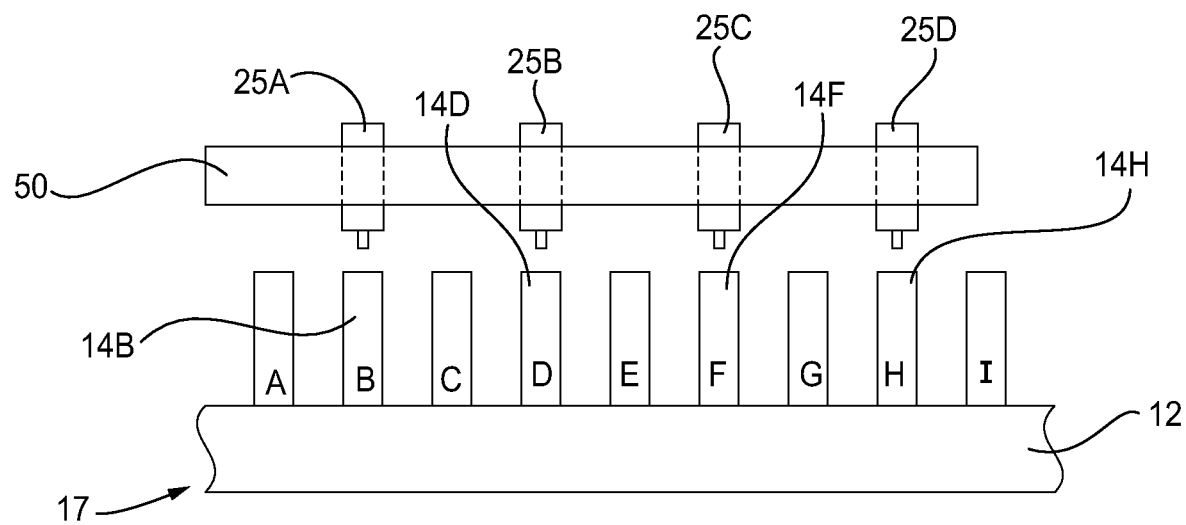
Figure 8D:
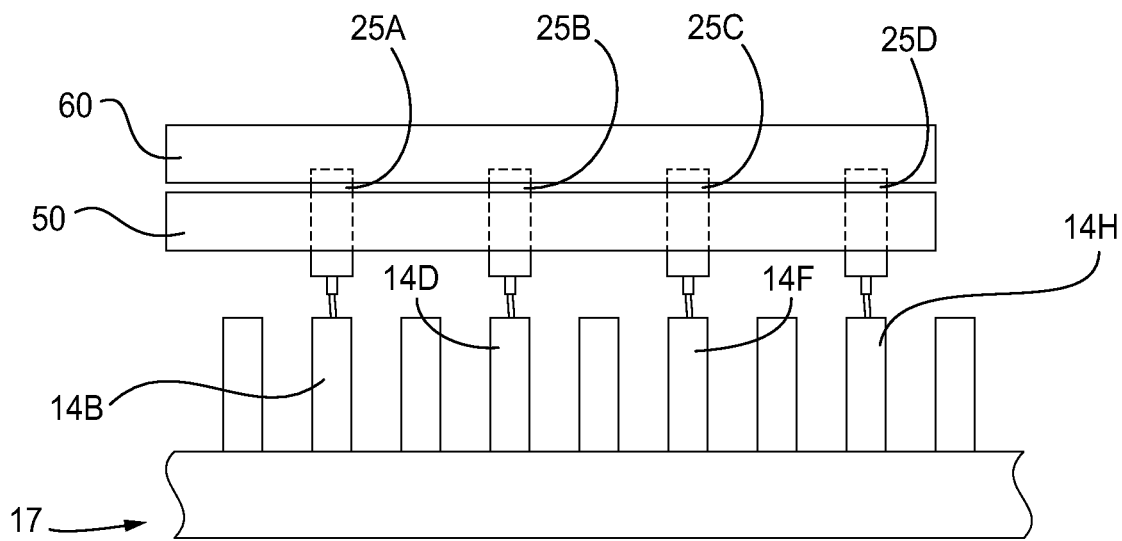

As further shown in FIG. 8C, the fan 50 is positioned over the cartridge/magazine assembly 17 such that slots 52, 54, 56, 58 extending through the fan 50 are aligned with cartridges 14B, 14D, 14F, 14H. As illustrated in FIG. 8D, a cassette clamp 60 is placed over the filter cassettes 25A-25D at which time each filter cassette 25A-25D extracts particles suspended in fluid from the sample supply container within the respective cartridges 14B, 14D, 14F, 14H. The particles suspended in fluid are then filtered and concentrated using the filter cassettes 25A-25D. Once the particles are concentrated, then the particles are deposited into the couvette 18 (FIG. 4) in each of the cartridges 14B, 14D, 14F, 14H for further optical analysis.

Figure 19:
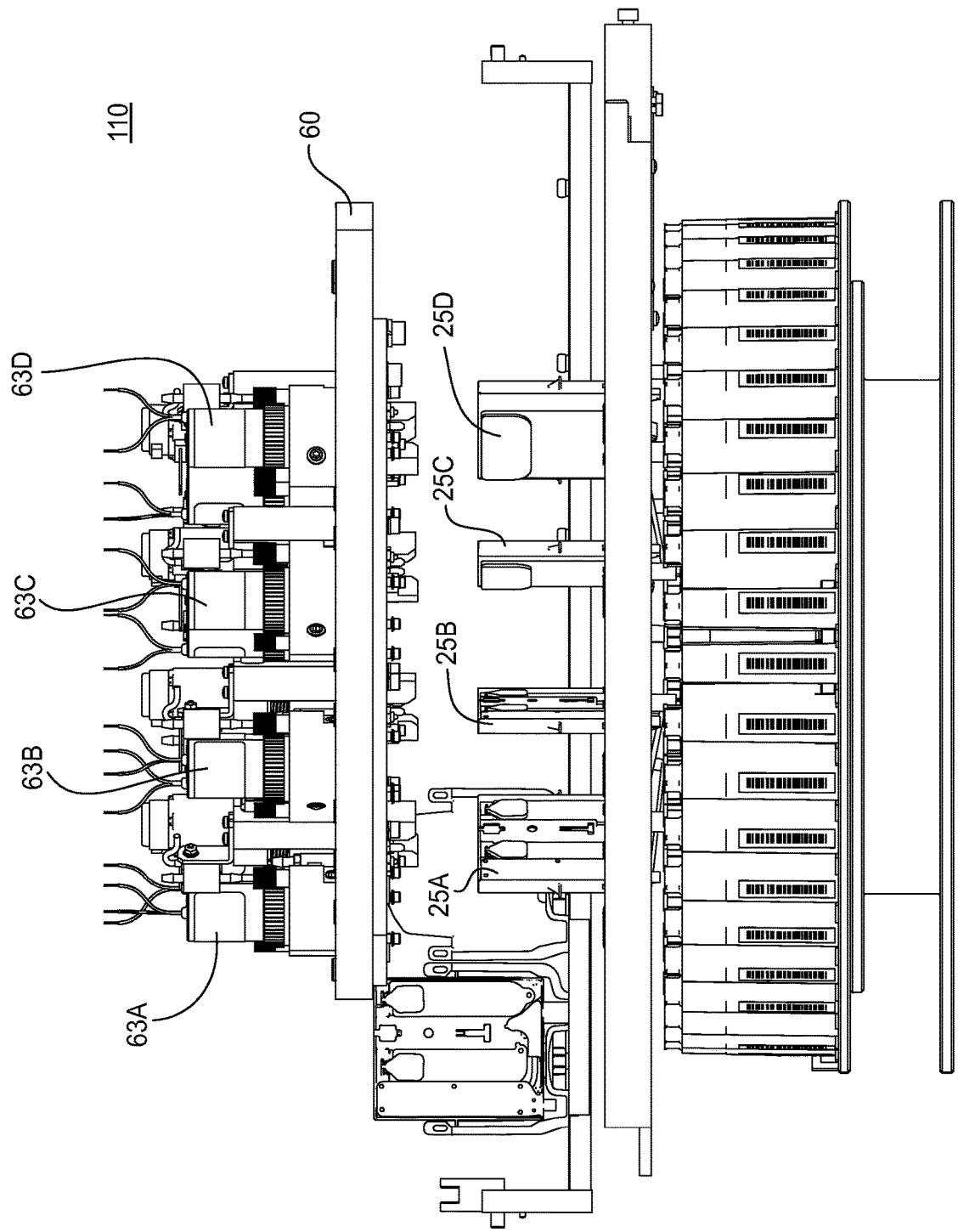
FIG. 19 is a front view of the arrangement in FIG. 18, but showing the cassette clamp wherein the cassette clamp is in the elevated position for insertion and removal of the filter cassettes.

It should be noted that the filter cassettes 25A-25D are associated with cartridges 14B, 14D, 14F, 14H. Each of these cartridges is spaced apart from one another by one cartridge. There is hardware between each of the filter cassettes, for example, 25B, 25D, which may limit the spacing between adjacent filter cassettes. While FIGS. 8A-8D show one filter cassette 14A, 14C, 14E, 14G between each filter cassette 25A-25D, another embodiment of the invention has two filter cassettes between each filter cartridge. In particular, FIG. 19 illustrates one such embodiment.

Figure 8E:
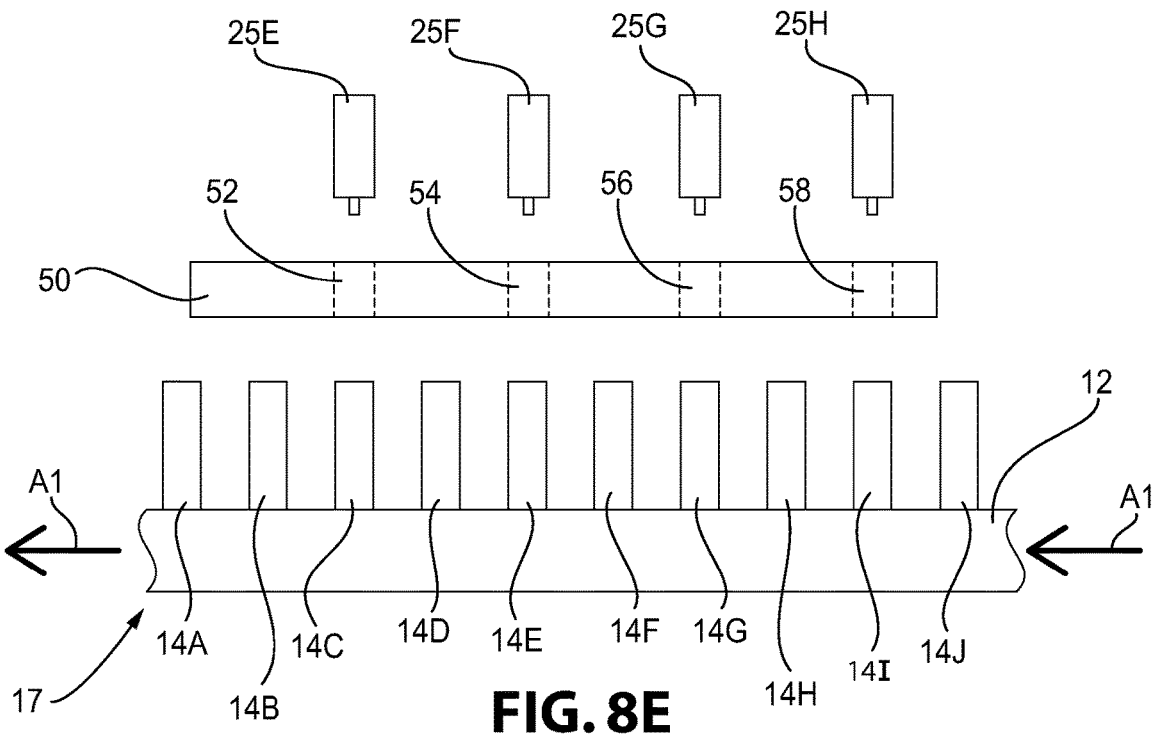
FIG. 8E shows the progression of cartridge/magazine assembly to position adjacent cartridges under filter cassettes for processing.
Figure 8F:
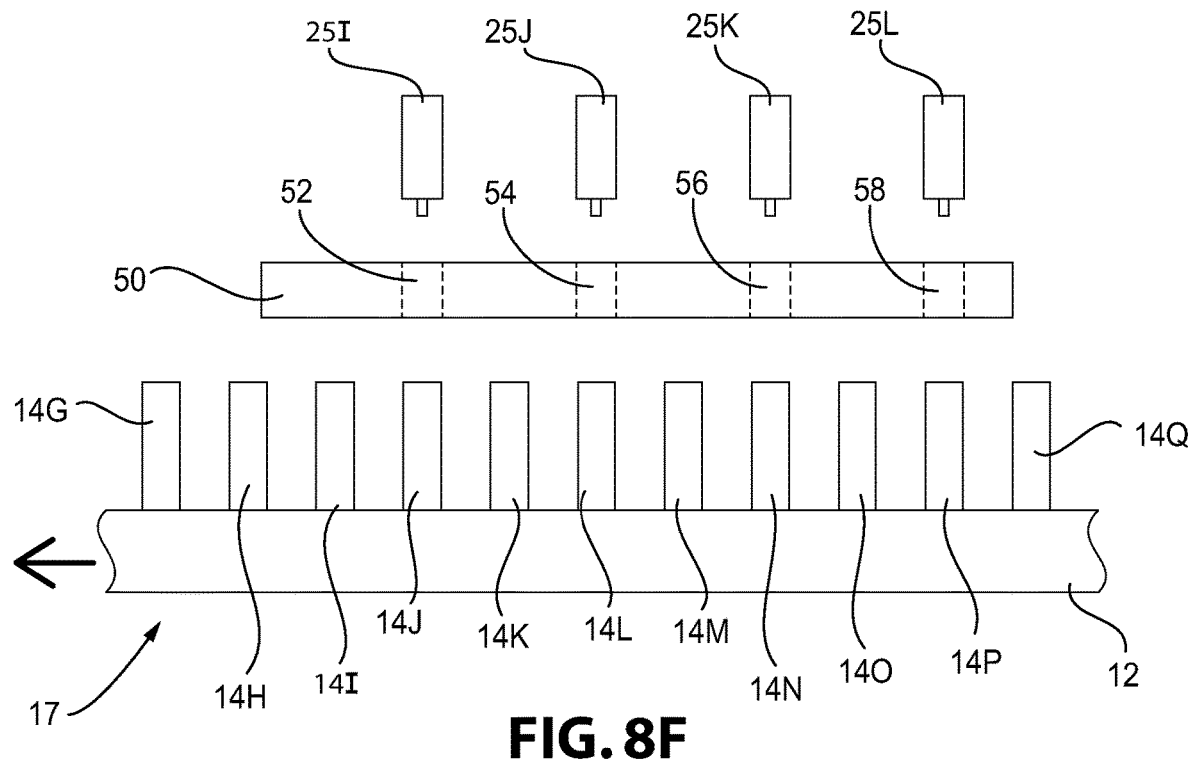
FIG. 8F shows the progression of the cartridge/magazine assembly to position a new subset of cartridges under the filter cassettes.

At an appropriate time, the cassette fan 50 and a carousel 62 (FIG. 10) may be indexed to remove used filter cassettes 25A-25D and to align newly mounted filter cassettes 25E-25H within the cassette fan 50 with different cartridges in the magazine 12. In particular, directing attention to FIG. 8E, the cartridge/magazine assembly 17 is indexed, as shown by arrows A1, to the left to align a set of adjacent cartridges 14C, 14E, 14G, 14I with the new filter cassettes 25E-25H for processing as described. Once processing of these cartridges is complete, then the assembly 17 cannot be indexed in direction A1 by only one cartridge since all but one of the adjacent cartridges have already been processed. Therefore, as illustrated in FIG. 8F, an entire new subset of cartridges 14J-14P is indexed such that cassettes 14J-14P are aligned and processed with yet another set of new filter cassettes 25I-25L. Thereafter, the assembly 17 is indexed to align cassettes 14K, 14M, 14O, and 14Q for processing. This sequence may be repeated until the entire inventory of cassettes in the magazine 12 is processed.

The discussion hereinafter will be directed to actual hardware that achieves these tasks.

Figure 9A:
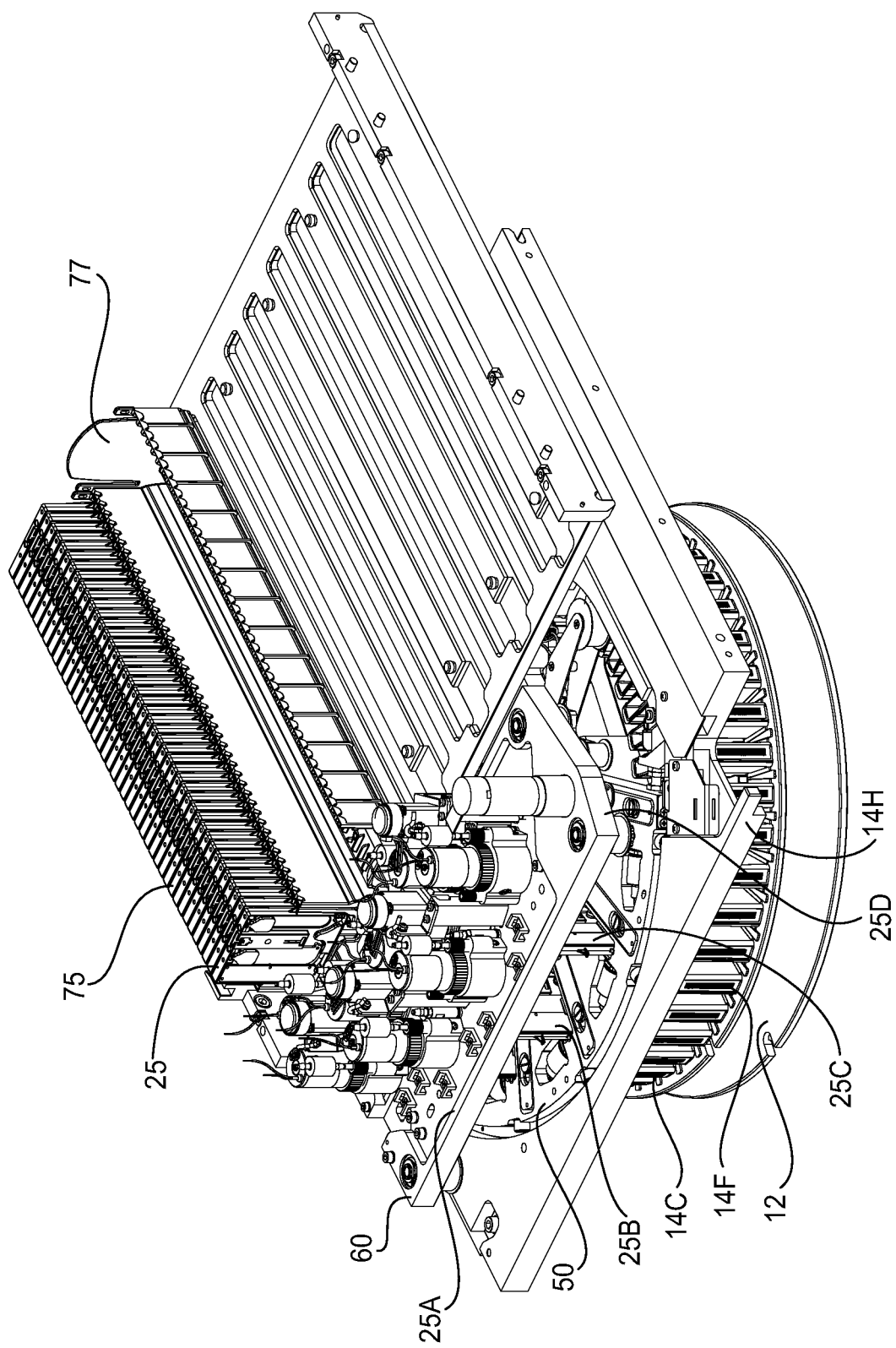
FIG. 9A is a perspective view of the processing system in accordance with the subject invention.
Figure 9B:
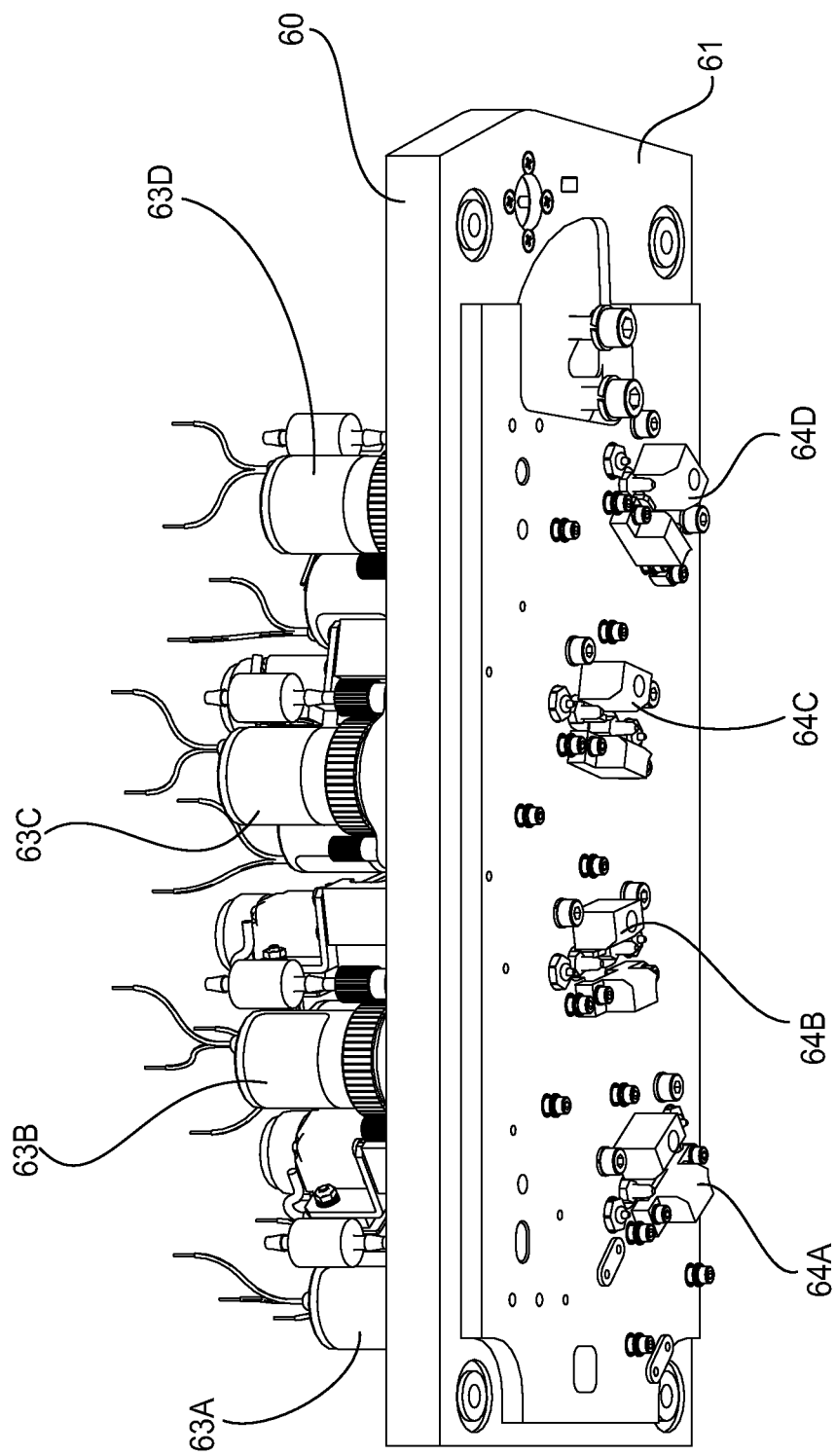
FIG. 9B is a perspective view of the underside of the cassette fan.

FIG. 9A is a perspective view of the entire system including the cartridge/magazine assembly 17, the cartridges 14A-14H, the cassette fan 50, filter cassettes 25A-25D, and the cassette clamp 60. FIG. 9B illustrates the underside 61 of the cassette clamp 60. The clamp has a set of connections 64A-64D each of which engages the ports 40A-40D of each of the filter cassettes 25A-25D. The cassette clamp 60 through the sets of connections 64A-64D provides elution fluid, rinse fluid and vacuum to the appropriate ports 40A-40D (FIG. 5) of the filter cassettes 25A-25D, while the motors 63A-63D situated on the cassette clamp 60 position the slide valve 42 (FIG. 6) of each filter cassette 25A-25D in the appropriate position so that the channels 44 (FIG. 6) establish the fluid path to achieve different stages of filtering within the filter cassettes 25A-25D.

Figure 10:
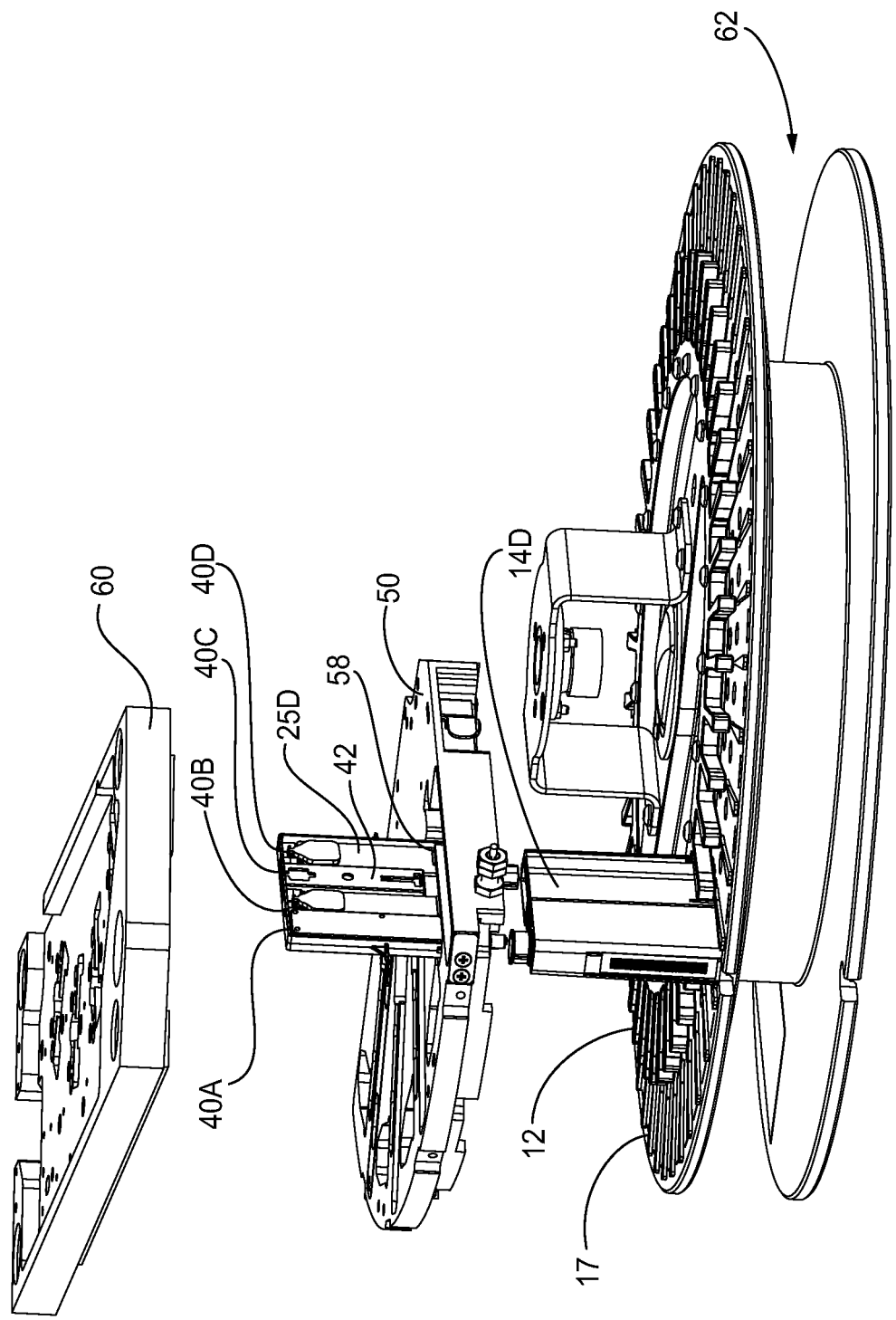
FIG. 10 is a perspective view of the processing system with the cassette clamp shown in view.

FIG. 10 illustrates a perspective view of one embodiment of the system whereby the cartridge/magazine assembly 17 is secured to the carousel 62. For clarity, only a single cartridge 14D and a single filter cassette 25D will be described with the understanding that the same discussion would apply to each of the multiple cartridges with multiple associated filter cassettes. A cassette fan 50 is positioned over the carousel 62 such that the filter cassette 25D, secured within a slot 58 of the cassette fan 50, is positioned directly over the cartridge 14D secured within the magazine 12.

Figure 11:
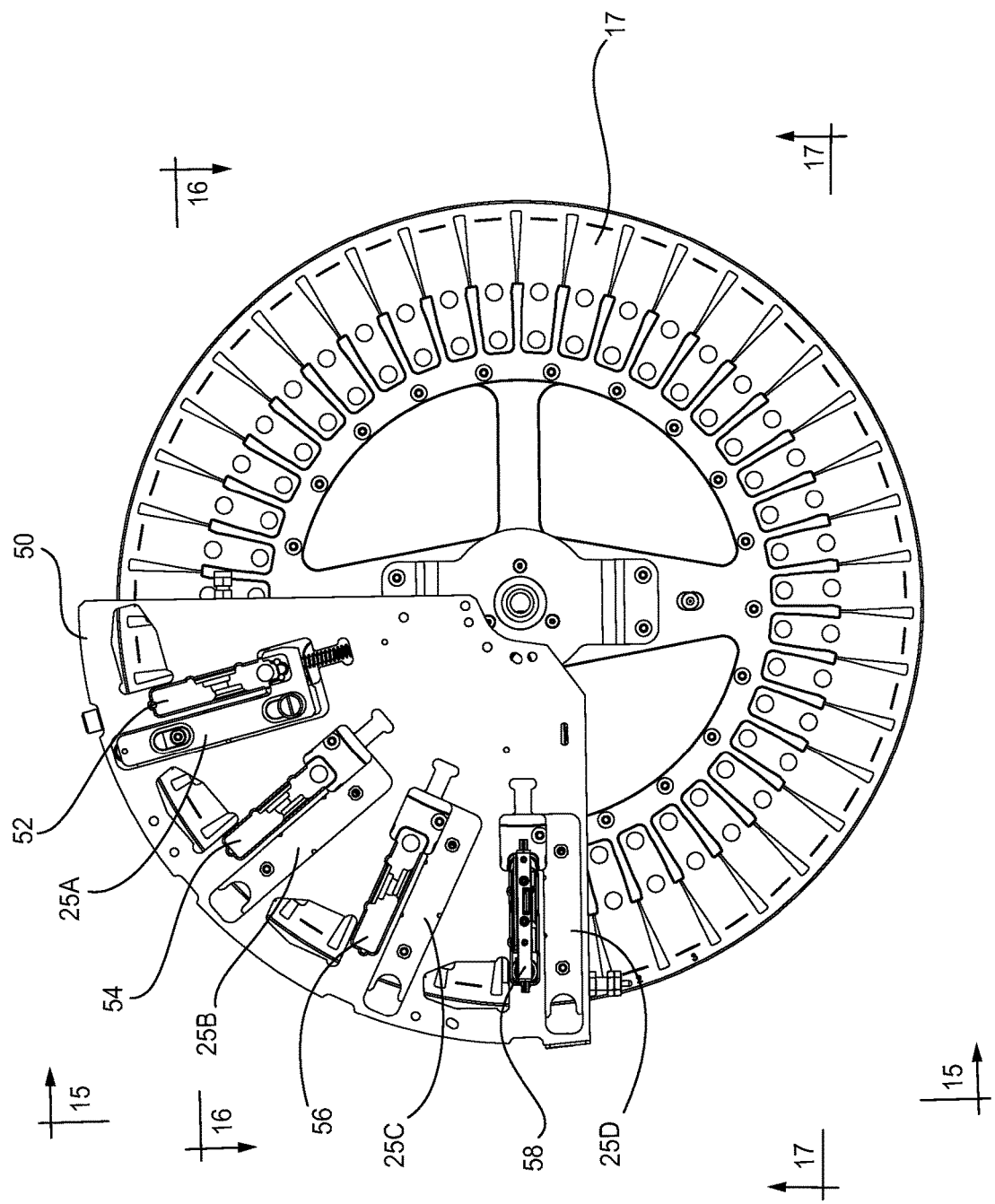
FIG. 11 is a top view of the cassette fan and the cartridge/magazine assembly illustrated in FIG. 9.

FIG. 11 illustrates a top view of the arrangement of FIG. 10 whereby, the cassette fan 50 includes four slots 52, 54, 56, 58 to accommodate four filter cassettes (not shown).

Figure 12:
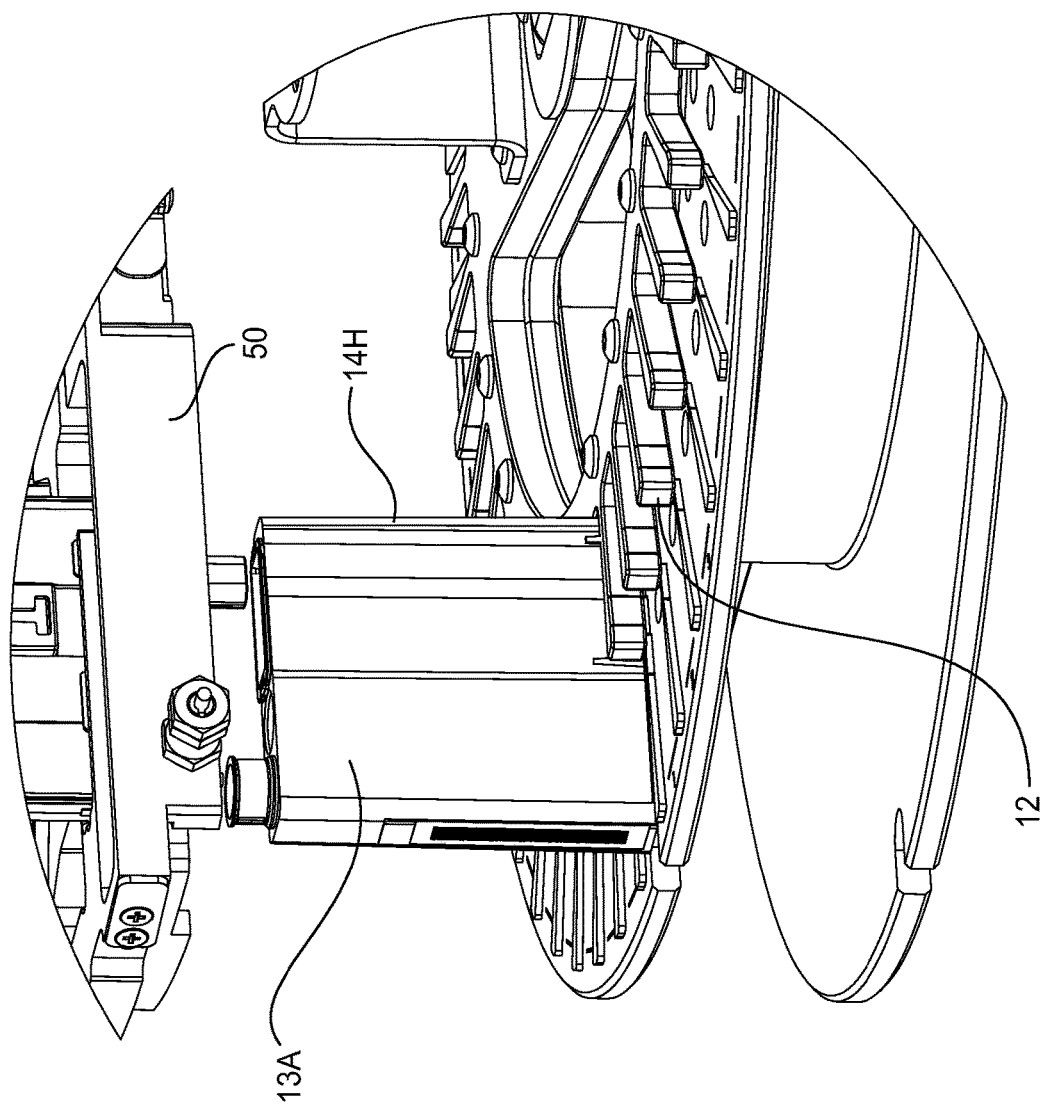
FIG. 12 is a view of a portion of FIG. 10 with the cartridge shown.

FIG. 12 shows a cartridge 14H positioned on the magazine 12 with the cassette fan 50 positioned above the cartridge 14H.

Figure 13:
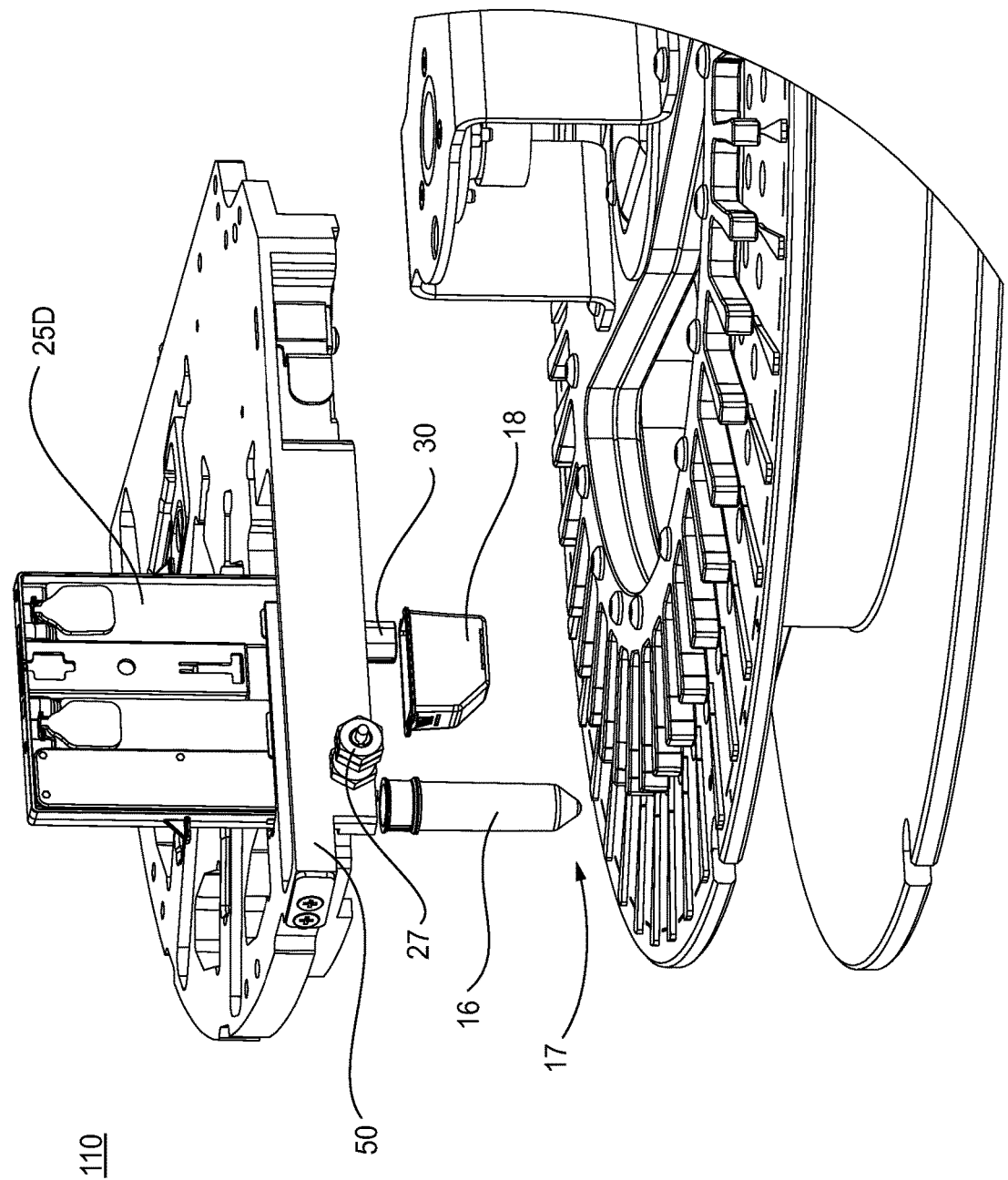
FIG. 13 is the view of FIG. 12 with the cartridge shell removed to show only the couvette and the sample supply container.

FIG. 13 is a perspective view similar to FIG. 12, wherein the cassette fan 50 is positioned above the cartridge/magazine assembly 17. However, for illustrative purposes, the shell 13A of the cartridge 14H (FIG. 12) has been removed to show only the sample supply container 16 and the couvette 18.

The filter cassette 25D has an inlet tube 28, wherein once the filter cassette 25D is properly positioned over the assembly 17 with the sample supply container 16 and the couvette 18, the biological sample with particles may be extracted from the sample supply container 16 and processed through the filter cassette 25D where it is discharged through the particle outlet 30.

The particle outlet 30 of the filter cassette 25D is positioned directly above the couvette 18 such that, after filtering, the concentrated particles suspended in fluid may be directly deposited from the filter cassette 25D through the particle outlet 30 into the couvette 18.

Figure 14:
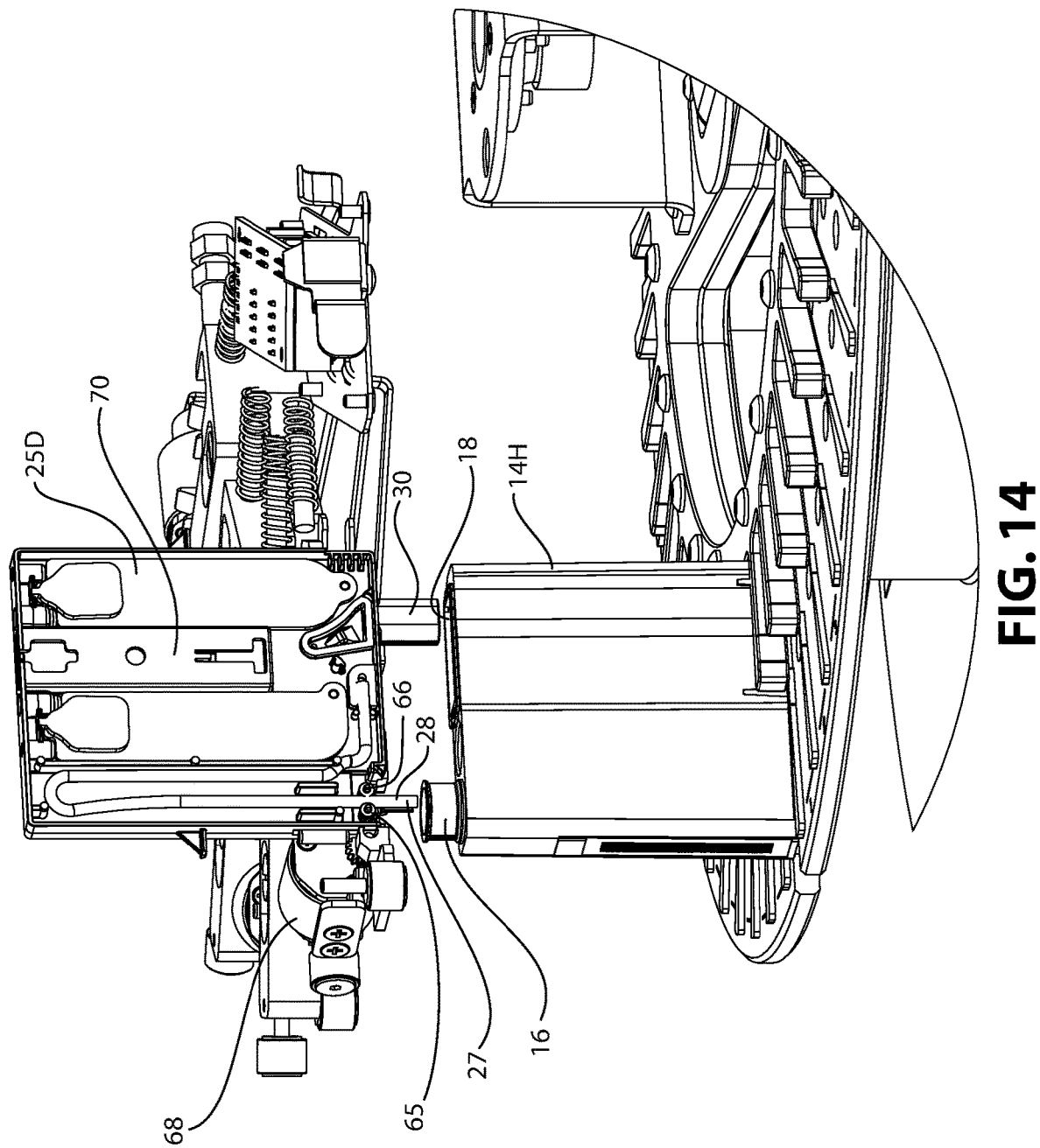
FIG. 14 is a view similar to that of FIG. 13, however, with the cover of the filter cassette removed to show the operating elements.

The filter cassette 25D as illustrated in FIG. 14 has the cover removed to expose the sample inlet 27, which is in the form of the inlet tube 28. Once the filter cassette 25D is properly positioned over the cartridge 14H by the cassette fan 50 (not shown), the inlet tube 28 is advanced by pinch rollers 65, 66 operated by a motor driven gear mechanism 68. In this fashion, filter cassette 25D may be proximate to the cartridge 14H, and the inlet tube 28 may be advanced into the sample supply container 16 to extract the biological sample for filtering. Thereafter, the tube 28 may be retracted from the sample supply container 16. The filtering process then proceeds using the filter cassette 25D.

Figure 15:
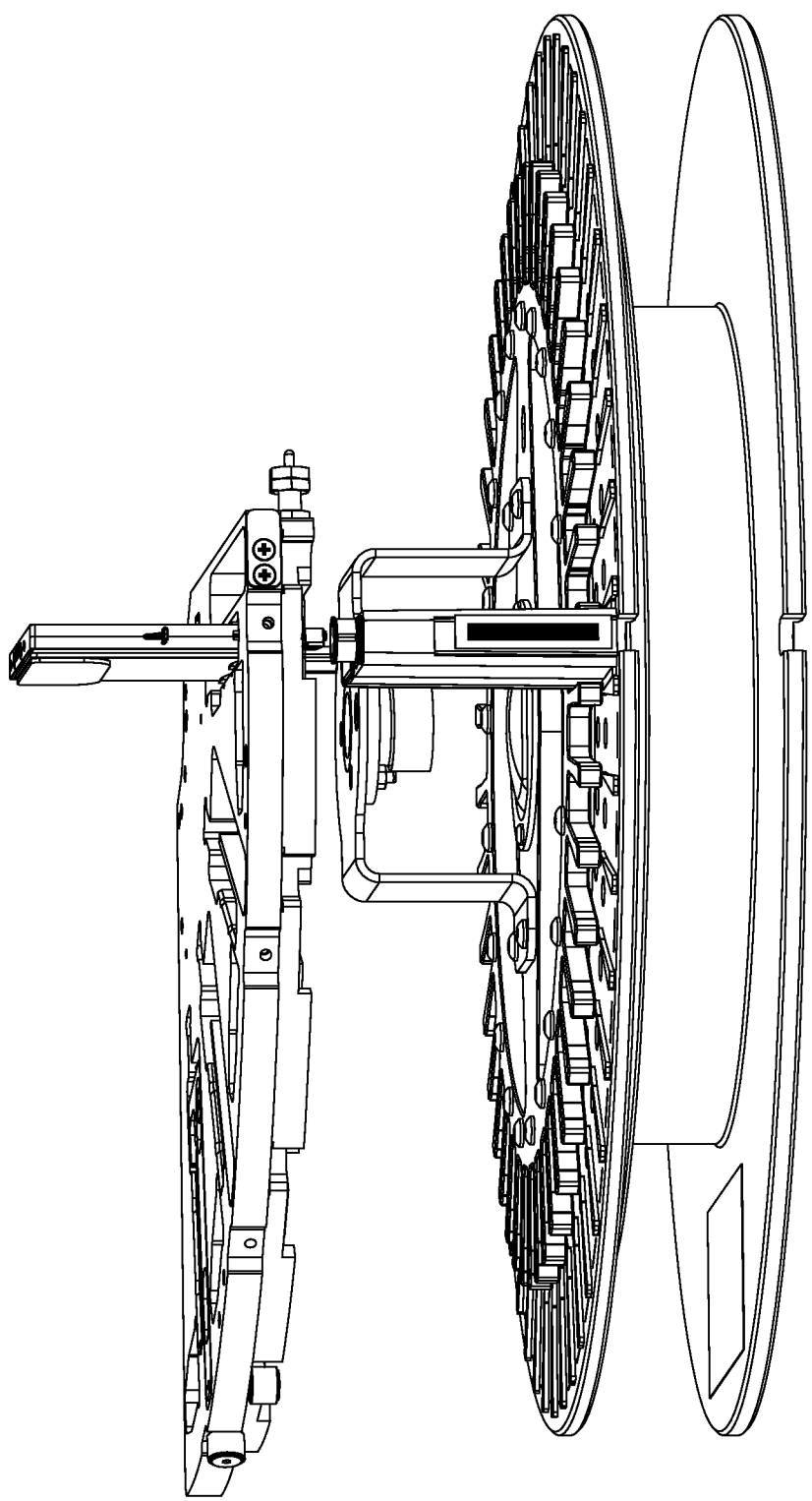
FIG. 15 is a side view along arrows 15-15 in FIG. 11.
Figure 16:
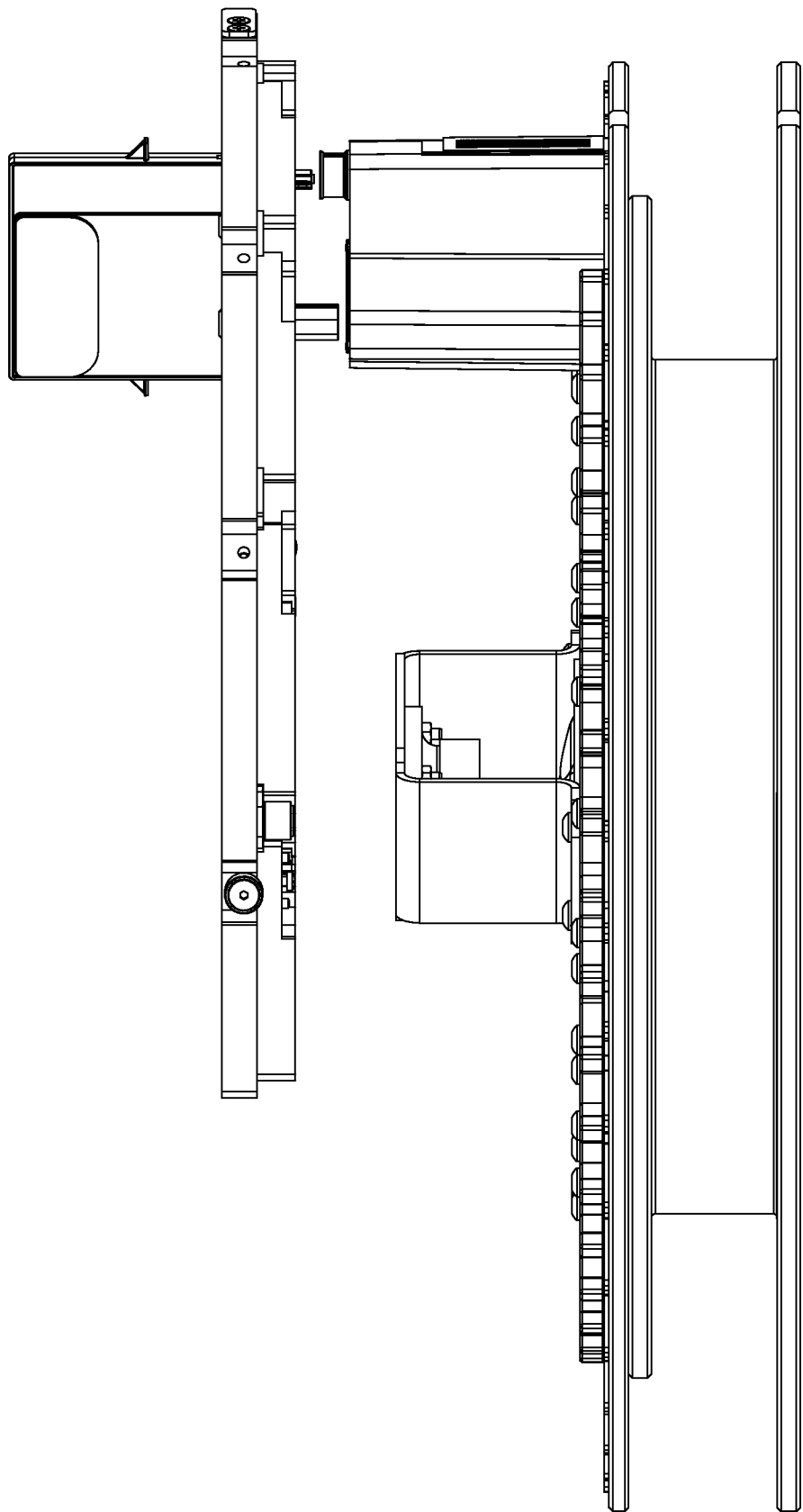
FIG. 16 is a view along arrows 16-16 in FIG. 11.
Figure 17:
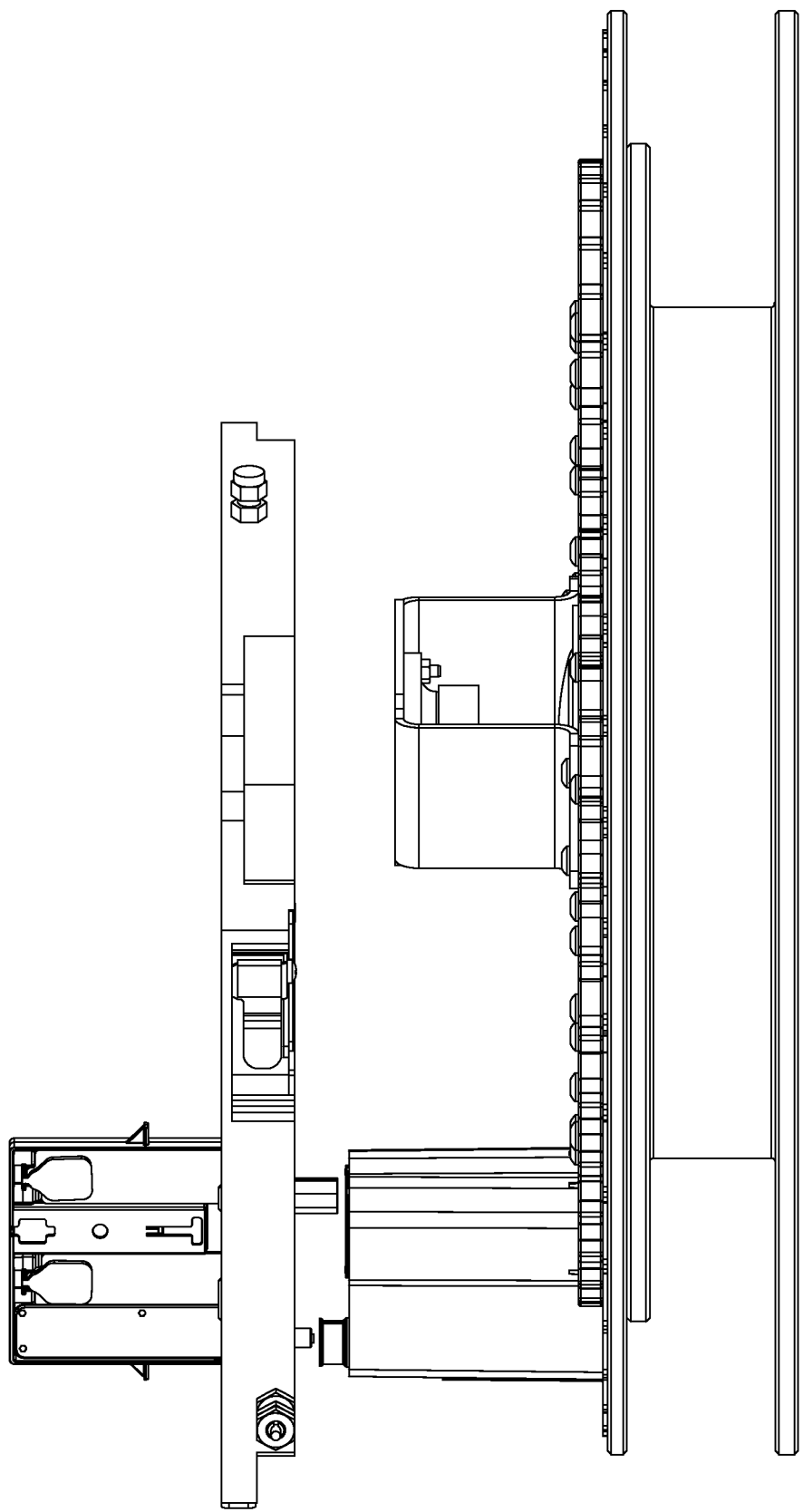
FIG. 17 is a view along arrows 17-17 in FIG. 11.

FIG. 15 is a side view along arrows 15-15 in FIG. 11, FIG. 16 is a side view along arrows 16-16 in FIG. 11, and FIG. 17 is a side view along arrows 17-17 in FIG. 11.

Figure 18:
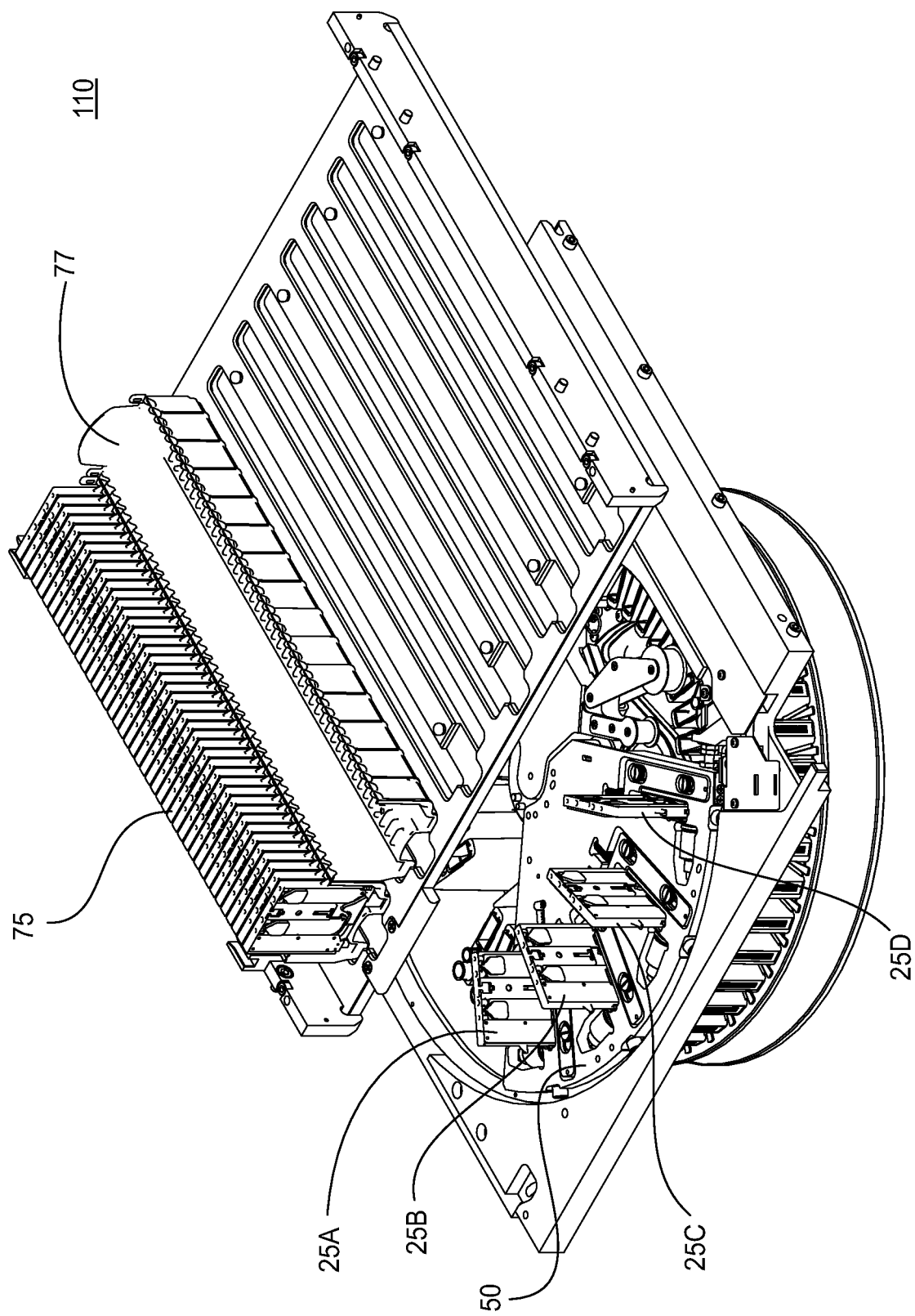
FIG. 18 is a perspective view of the processing system with the cassette clamp and associated hardware removed.

FIG. 18 is similar to FIG. 9A but with the cassette clamp 60 removed to illustrate details of the cassette fan 50.

Figure 20:
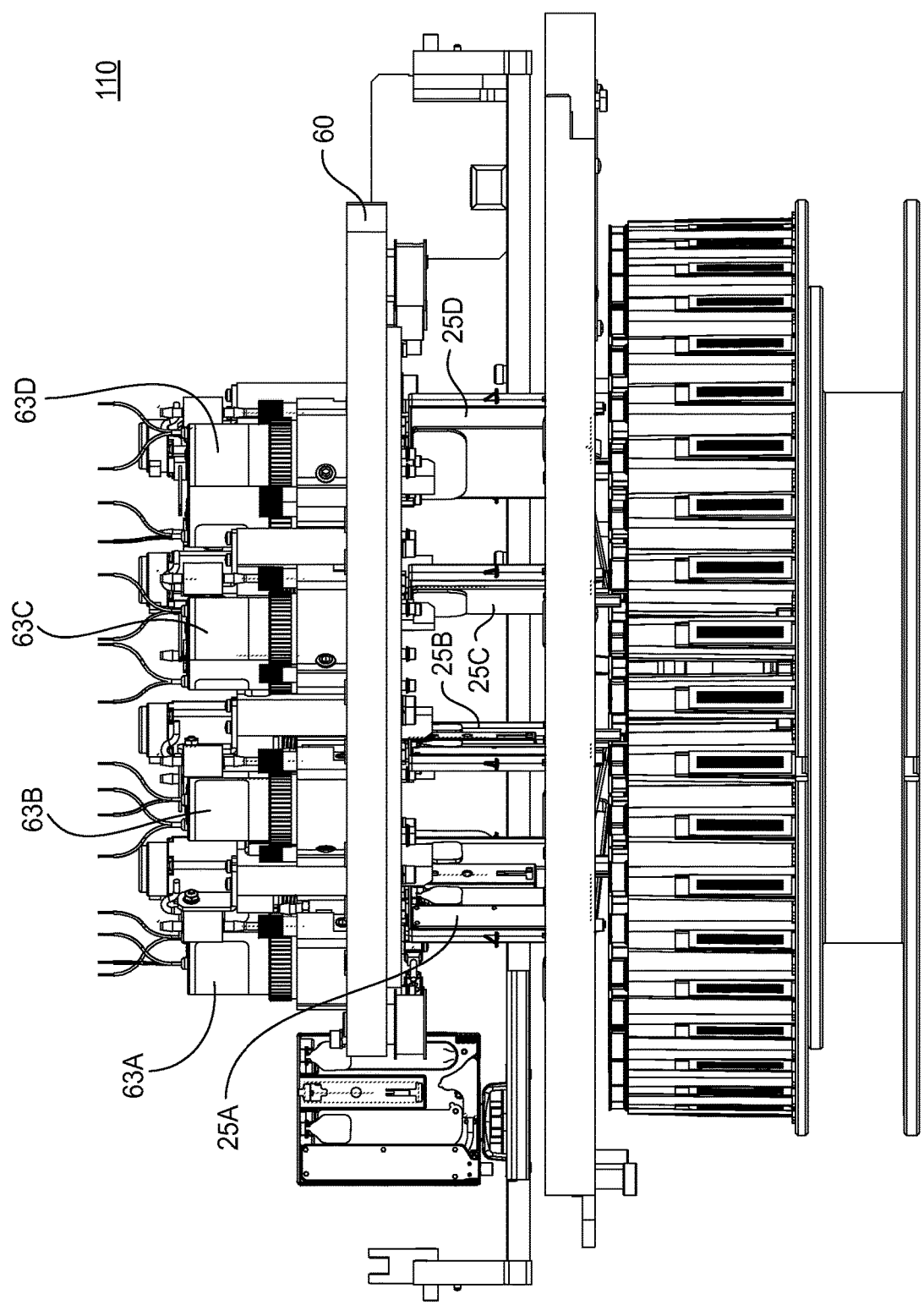
FIG. 20 is a front view similar to that of FIG. 19, but with the cassette clamp engaged and securing the filter cassette to the cassette fan.
Figure 21:
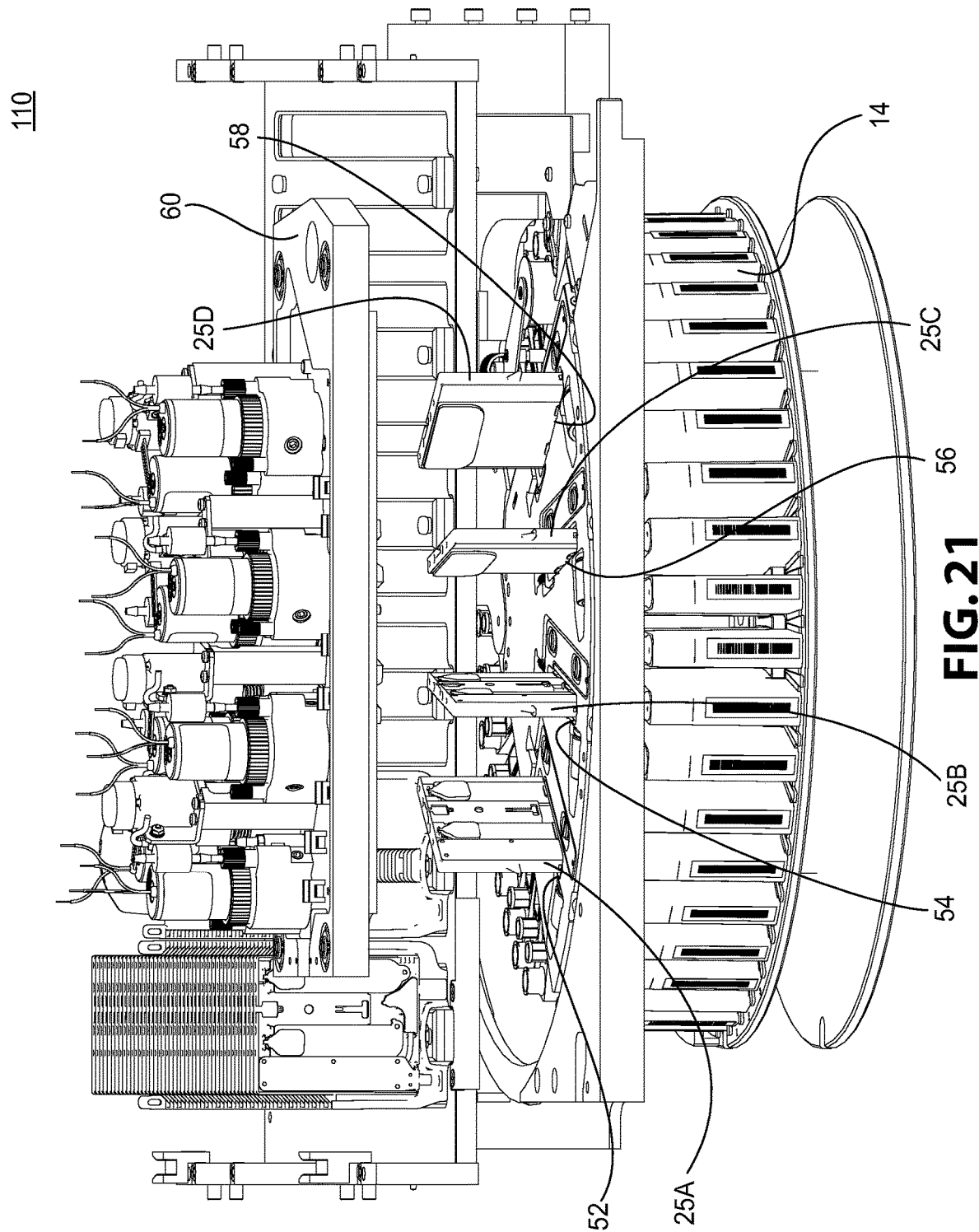
FIG. 21 is a perspective view of FIG. 19.

FIGS. 19 and 20 show the system 110 with the cassette clamp 60 in the retracted position (FIG. 19) above the filter cassettes 25A-25D and lowered (FIG. 20) to engage the filter cassettes 25A-25D. The cassette clamp 60 not only secures each cassette 25A-25D, but the clamp 60 is also utilized to operate each filter cassette 25A-25D. FIG. 21 shows a perspective view of the system 110 with the cassette clamp 60 retracted from the filter cassettes 25A-25D (FIG. 20). While the cassette fan 50, as shown, supports four filter cassettes 25A-25D, it may be modified to accommodate any number of filter cassettes.

FIG. 18 shows the processing system 110 with the fan 50 and the associated hardware removed for a clear view of the filter cassette supply magazine 75 and the filter cassette depository magazine 77. As illustrated in FIG. 11, the fan 50 rotates about a center axis such that each slot 52, 54, 56, 58 of the fan 50 is rotated into a position parallel to the cassette 25 in the supply magazine 75. A mechanical arm (not shown) picks a filter cassette 25 from the supply magazine 75 and places it in a vacant slot of the fan 50. The fan 50 is then indexed so the next vacant slot is parallel to the cassette 25 and that cassette is picked and placed into the slot.

The fan 50 is then rotated and indexed so that the newly mounted filter cassettes 25 are aligned with respective cartridges 14. As illustrated in FIG. 21, when the filter cassettes 25 are being changed out from the fan 50, the clamp 60 is vertically displaced to provide clearance. However, as illustrated in FIG. 20, thereafter, the clamp 60 is lowered such that the ports 40A, 40B, 40C, 40D (FIG. 5) are attached to corresponding connectors in the clamp 60 for processing.

After processing, the clamp 60 is again moved to the raised position (FIG. 21), the fan 50 indexed, and the used filter cassettes 25 are removed from the fan 50 and placed within the filter cassette depository magazine 77 (FIG. 18).

Thereafter, the fan 50 is again populated with new filter cassettes and indexed to align with other cartridges for processing.

The filtering process associated with individual cartridges 14 and their associated filter cassettes 25, depending upon the biological sample being analyzed, may take varying amounts of time to complete. Therefore, each cartridge 14/filter cassette 25 pair operates independently from the other cartridge 14/filter cassette 25 pairs.

Overall a system 110 for processing a biological sample for optical analysis has a plurality of cartridges 14, wherein each cartridge 14 has a sample supply container 16 for receiving a fluid/particle mixture and each cartridge has a couvette 18 for receiving particles filtered from the fluid/particle mixture. A cartridge magazine 17 has receivers for holding the plurality of cartridges 14. A cassette fan 50 has a plurality of slots 52, 54, 56, 58 extending therethrough with each slot adapted to hold a filter cassette 25. The cassette fan 50 is movable from a first position aligned with select cartridges 14 within the magazine 12 to a second position away from the cartridges 14. A cassette clamp 60 positioned over the cassette fan 50 is adapted to secure each filter cassette 14A-14D within the fan 50 and to operate the filter cassettes 14A-14D.

Additionally, a method for processing a biological sample for optical analysis may comprise the steps holding a plurality of cartridges 14 within receivers of a cartridge magazine 12, wherein each cartridge 14 has a sample supply container 16 for receiving a fluid/particle mixture and each cartridge 14 has a couvette 18 for receiving particles filtered from the fluid/particle mixture. A cassette fan 50 has a plurality of slots 52, 54, 56, 58 extending therethrough with each slot adapted to hold a filter cassette 25A-25D. The fan 50 moves the cassette fan 50 to a first position aligned with select cartridges in the magazine 12. A cassette clamp 60 is positioned over the cassette fan 50 and secures each filter cassette 25A-25D within the fan 50 and operates each filter cassette 25A-25D.

Once each couvette 18 has been filled with concentrated particles in fluid, then an optical analysis may be performed upon the sample using the technique described in the '114 patent, previously discussed herein.

As a brief overview, the filtering process is as follows. Inside each filter cassette, illustrated schematically as 300, is a top element 315, a bottom element 320 and a filter element 325 therebetween. A fluid particle mixture is deposited upon an upper surface 345 of the filter element 325. Thereafter, a rinse fluid from inlet 330 is passed through the upper surface 345 of the filter element 325 to remove under-sized particle from the filter surface 345. After the rinse fluid is passed through the filter element 325, it becomes waste fluid and is deposited into a collector. The upper surface 345 of the filter element 325 is then tangentially rinsed with an elution fluid to displace the deposited particles for further processing.

However, the rate of flow of rinse fluid through each filter varies depending upon the amount of clogging produced by the particles in each filter. To provide a uniform filtering process at each filter, it is necessary to achieve a relatively uniform volume of flow past each filter. Because of the varying rate of flow through each filter, this task cannot be achieved by activating the flow for a fixed amount of time for each filter. The inventor has discovered that it is possible to measure the volume of flow past each filter using different non-time dependent techniques. In particular, the volume of flow is measured after the rinse fluid has passed through the filter based upon the weight or the volume of the fluid. In one embodiment, the waste fluid is accumulated in a vessel placed over a load cell and the weight of the accumulated fluid is measured until a predetermined weight is reached. At that time, the flow of the rinse fluid is discontinued for that filter. Then tangential wiping with the elution fluid is started and thereafter the filtering procedure associated with that particular cartridge 14 and filter cassette 25 pair is stopped.

Figure 22:
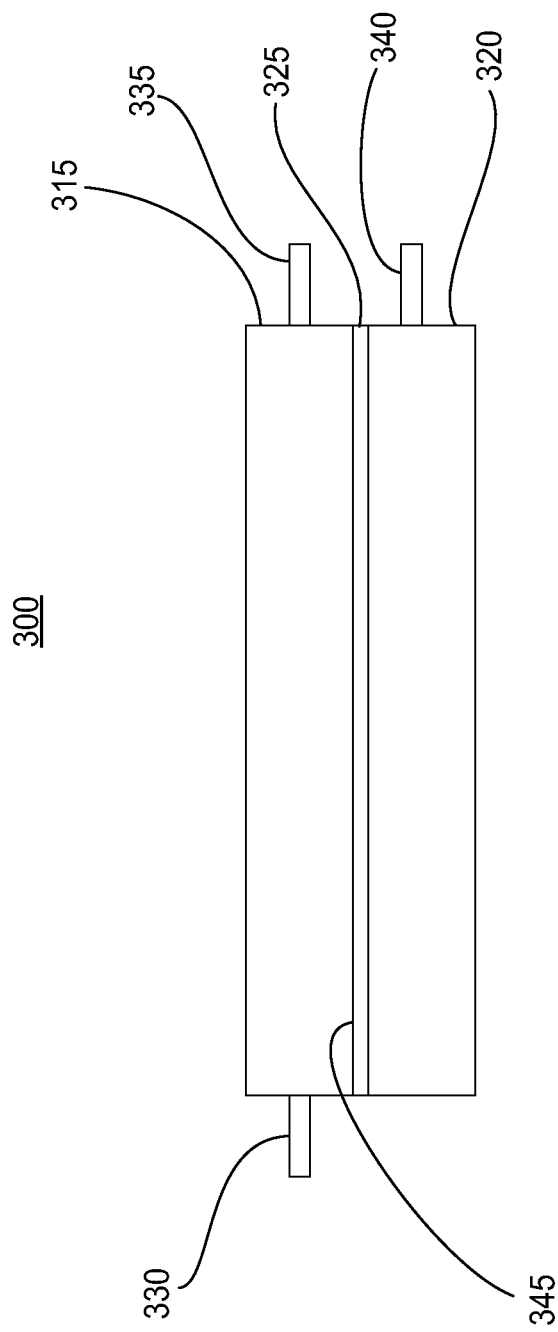
FIG. 22 is a schematic of single filter element associated with a cassette filter.
Figure 22A:
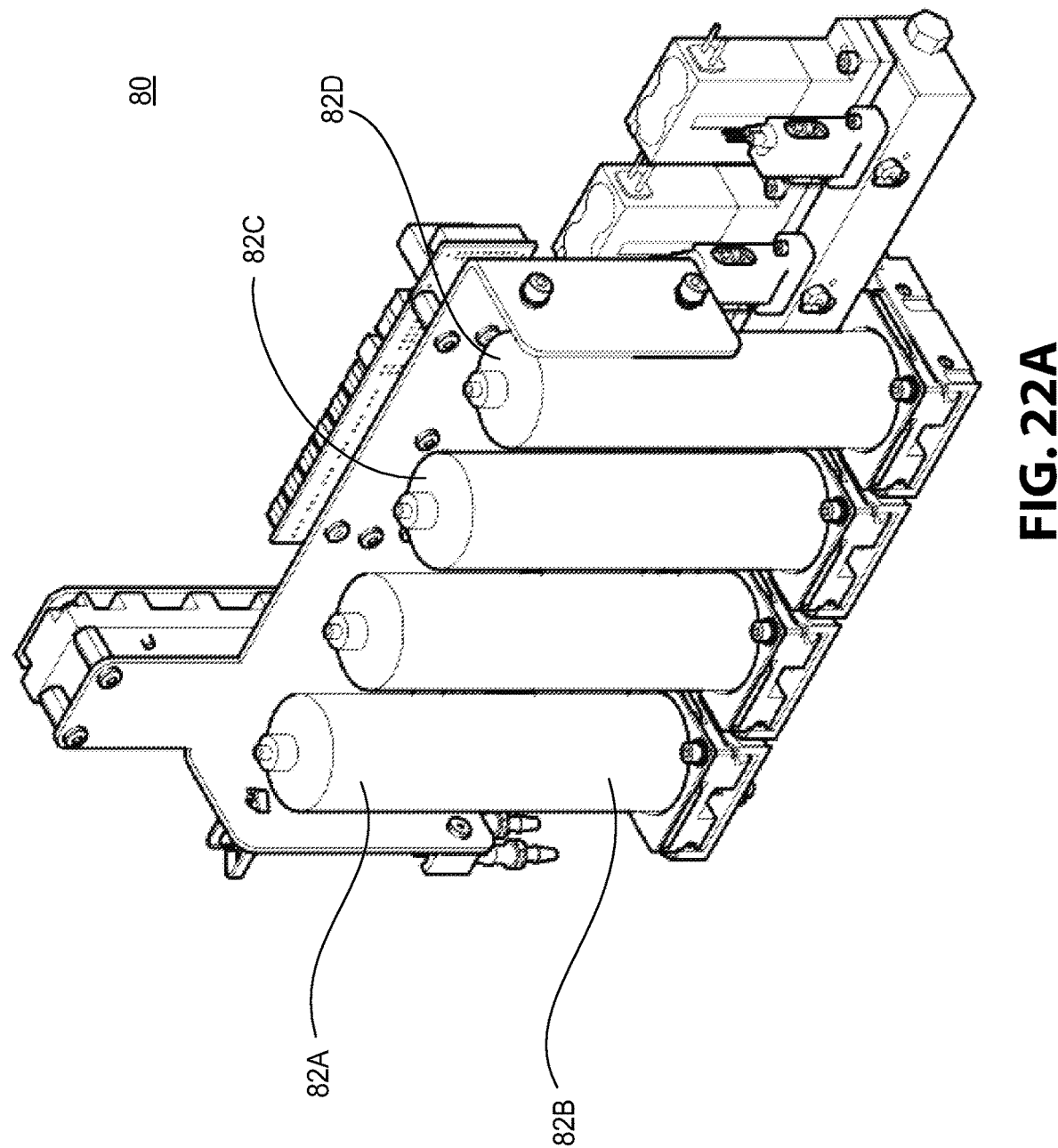
FIGS. 22A and 23 are perspective views of a module containing load cells.
Figure 23:
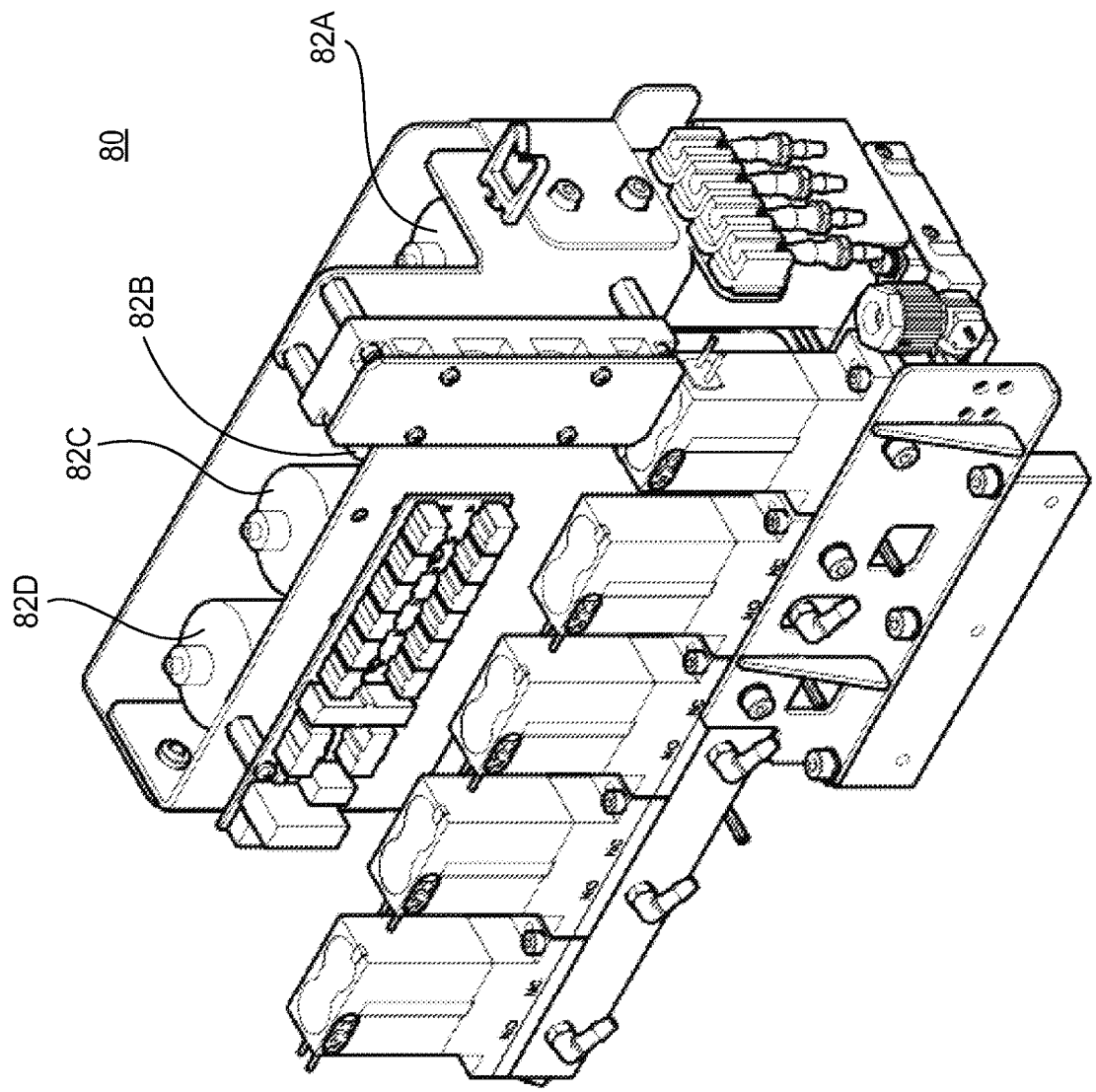
Figure 24:
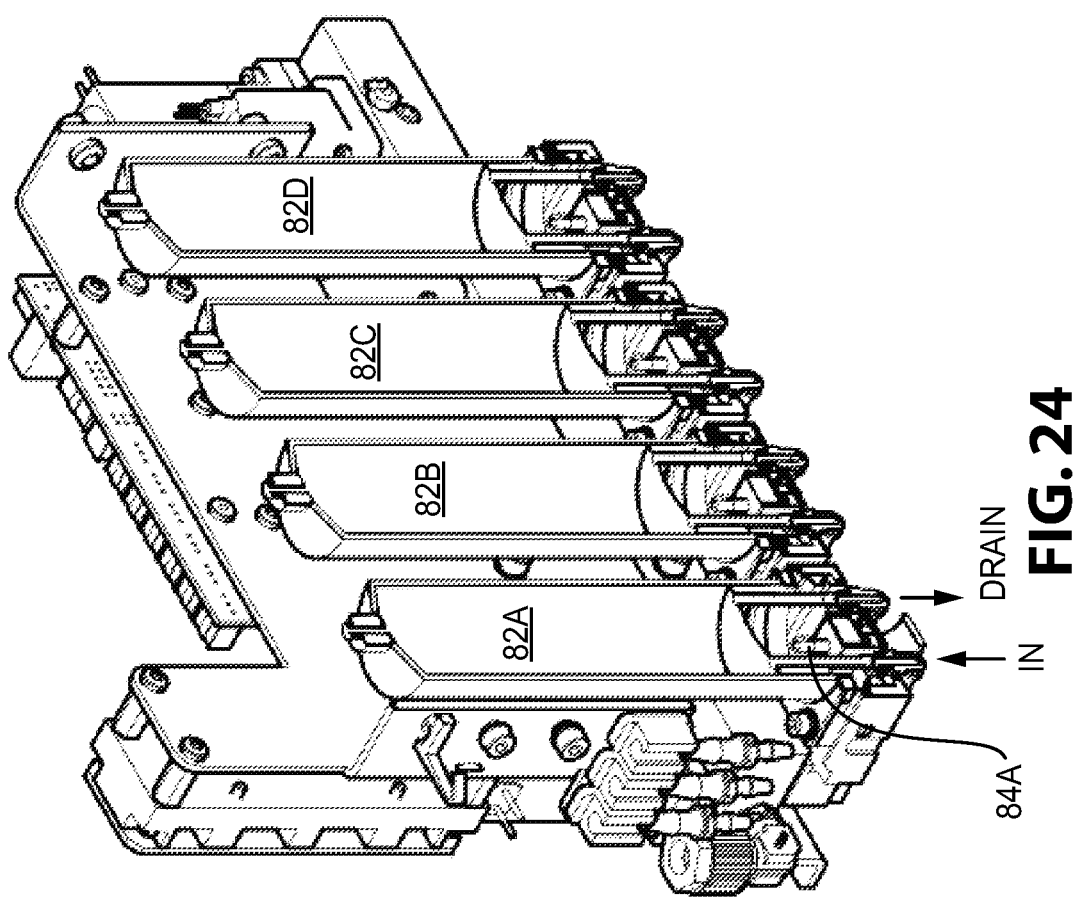
FIGS. 24 and 25 are cross-sectional views of the load cells in FIGS. 22 and 23.
Figure 25:
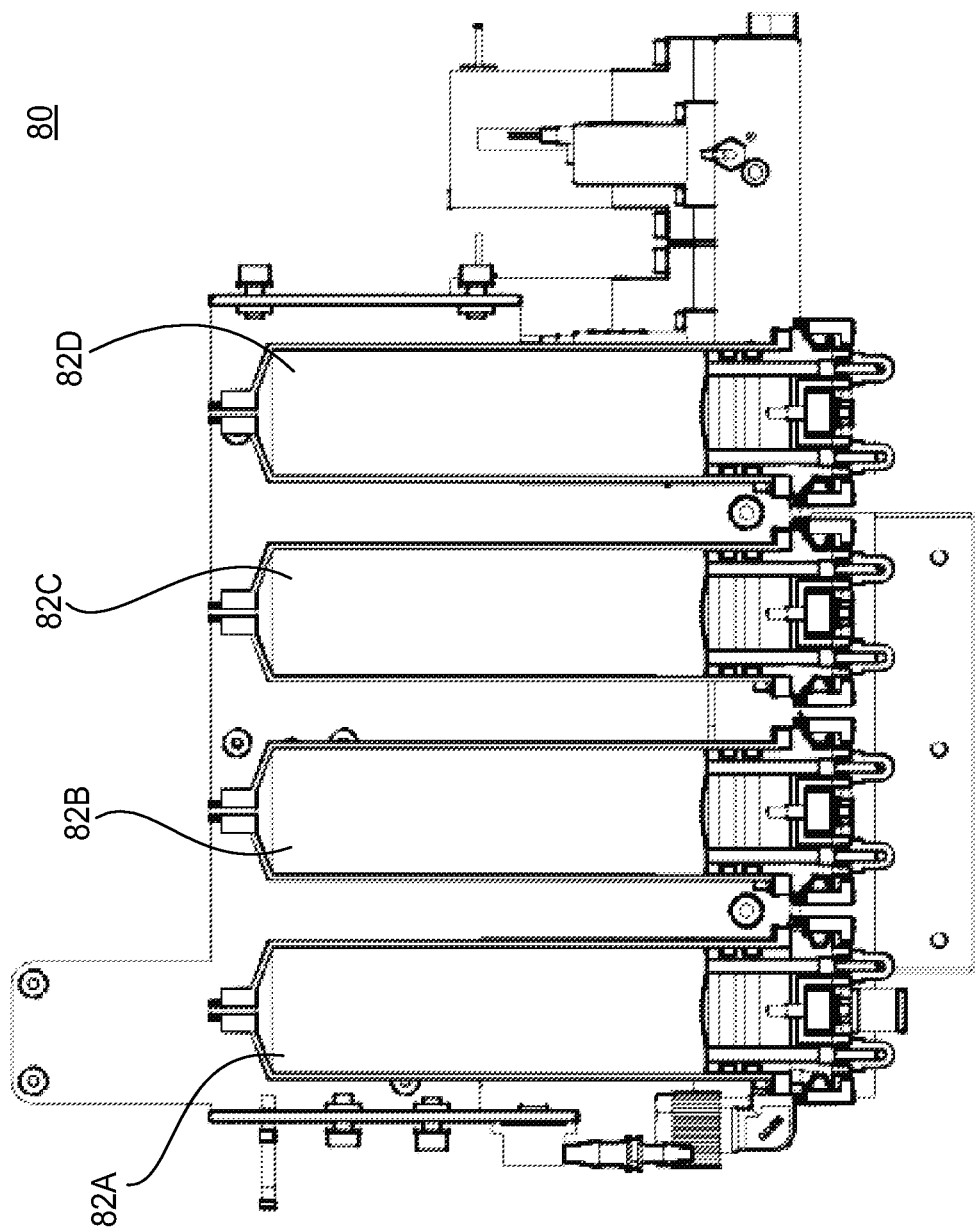
Figure 26:
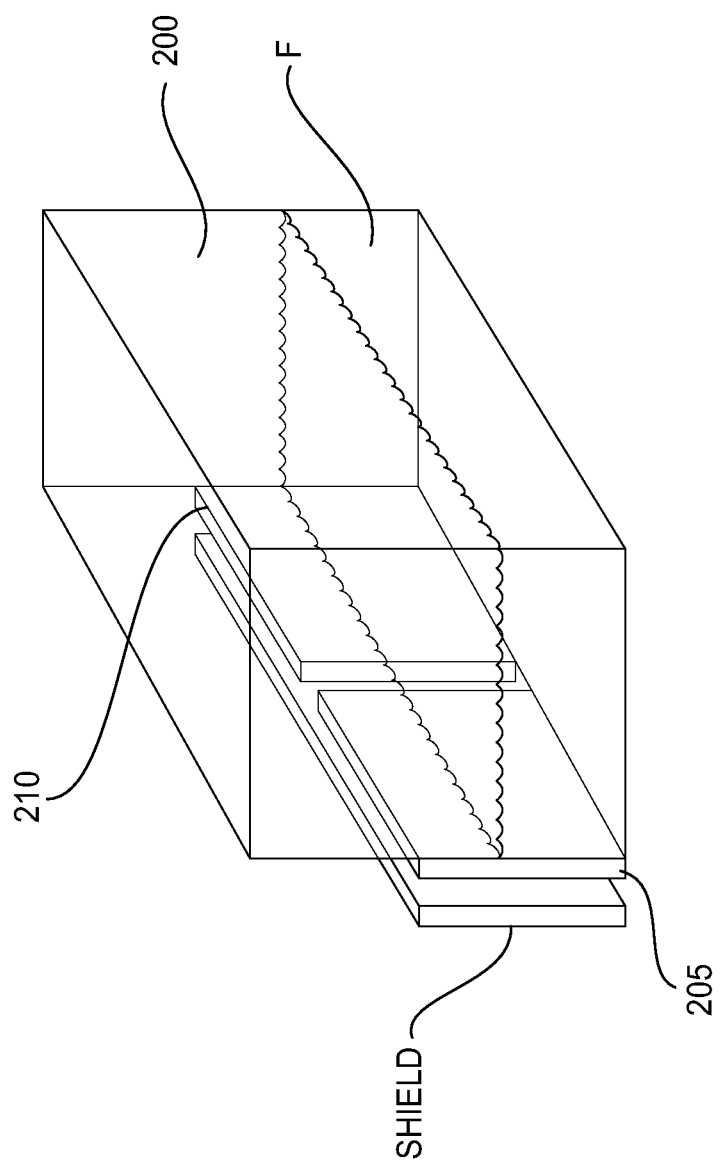
FIG. 26 is a schematic of a measurement technique utilizing a capacitive liquid level sensor.

The rinsing of a sample from a single cartridge continues until the waste fluid, which is rinse fluid that has passed though the filter element 25, reaches a certain quantity measured by mass or volume. In one embodiment, this is achieved using a load cell to determine the weight of the rinse fluid. FIGS. 22 and 23 illustrate perspective views of a module 80 having four vessels 82A-82D with load cells 84A-84D. Each vessel 82A-82D is associated with a filter cassette such that when a new filter cassette 25 is used to process the sample from the sample supply container 16 of a cartridge 14, the quantity of waste fluid passing through the filter cassette is measured by the load cell until a predetermined threshold has been reached. At that time, the rinsing stops and the waste fluid is discharged from the load cell. FIGS. 24 and 25 show cross-section views of the vessels 82A-82D.

FIG. 24 shows details of a mass meter 80 having four vessels 82A, 82B, 82C and 82D each associated with a separate filter cassette. Directing attention to vessel 82A with the understanding that the remaining vessels are identical, vessel 82A rests upon a load cell 84, such as a piezoelectric transducer. The weight of the fluid within the vessel 82A may be determined using this load cell 84. In such a fashion, an accurate estimation of the volume of fluid travelling through each filter is provided by the weight of the fluid within the vessel 82A associated with that filter without the need to use direct volume measuring devices. Such direct volume measuring devices are not ideal for variable flow, such as that through a filter which may be partially clogged, and are relatively expensive.

While fluid weight has been discussed, there are a number of other techniques for measuring the amount of waste fluid passing through the filter. While the load cell illustrated in FIGS. 22-25 herein are in cylindrical vessels, for purposes of illustration, the container shown while illustrating other measurement techniques will be rectangular.

Figure 1:
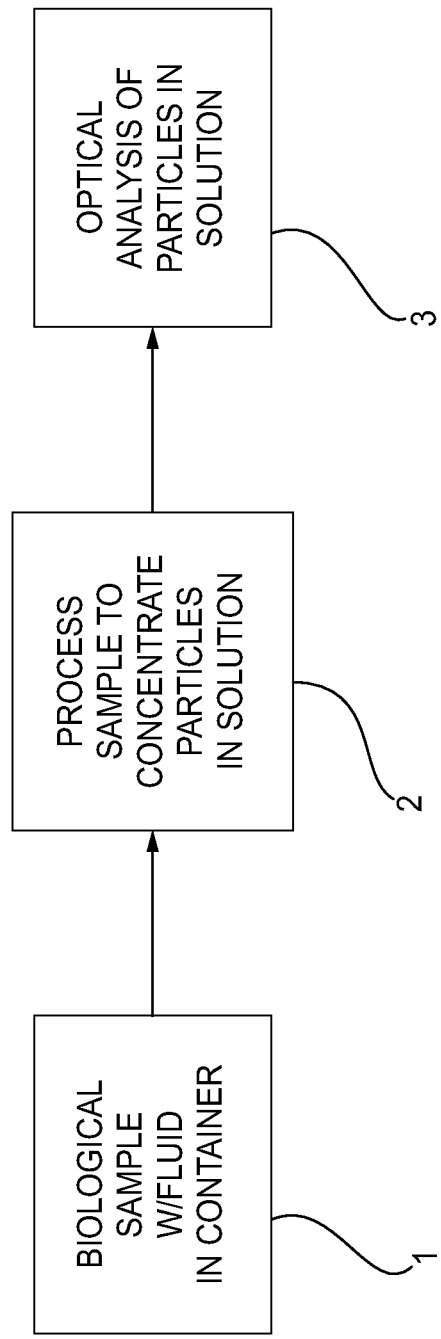
FIG. 1 is a schematic and shows the prior art steps for processing a biological sample in preparation for optical analysis.

Direct level sensing using capacitive liquid level sensors may be utilized. As for example, FIG. 1 illustrates a container 200 with fluid F therein. A capacitive level sensor, which is known to those skilled in the art, includes two electrodes 205, 210 electrically insulated from each other. As the liquid in the container 200 rises, the dielectric between the two electrodes changes from essentially air to liquid and, as a result, the capacitance changes. By measuring this change of capacitance, the liquid level can be determined.

Figure 27:
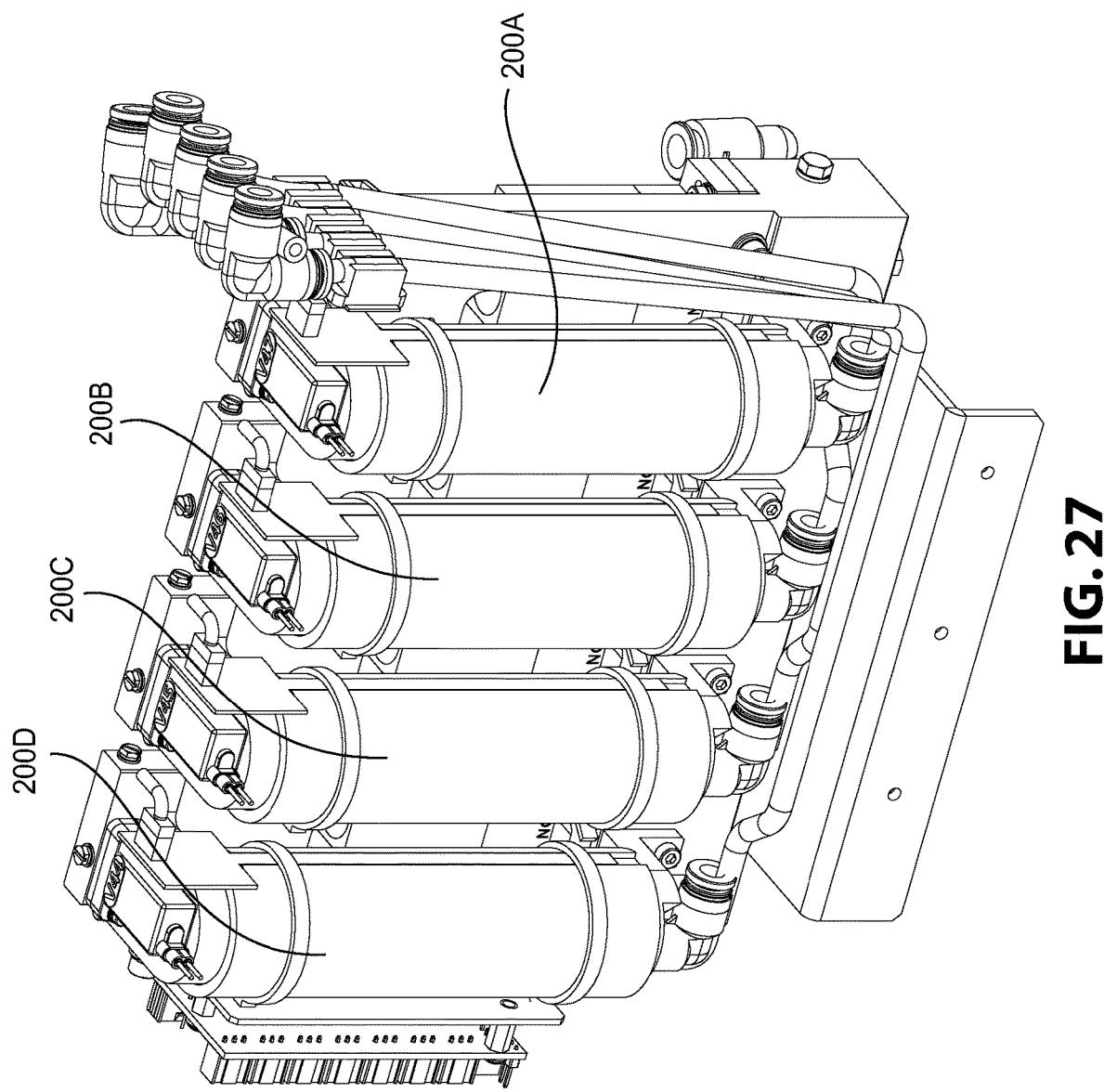
FIG. 27 is a front perspective view of one embodiment of an apparatus utilizing a capacitive liquid level sensor to determine the volume of waste fluid.
Figure 28:
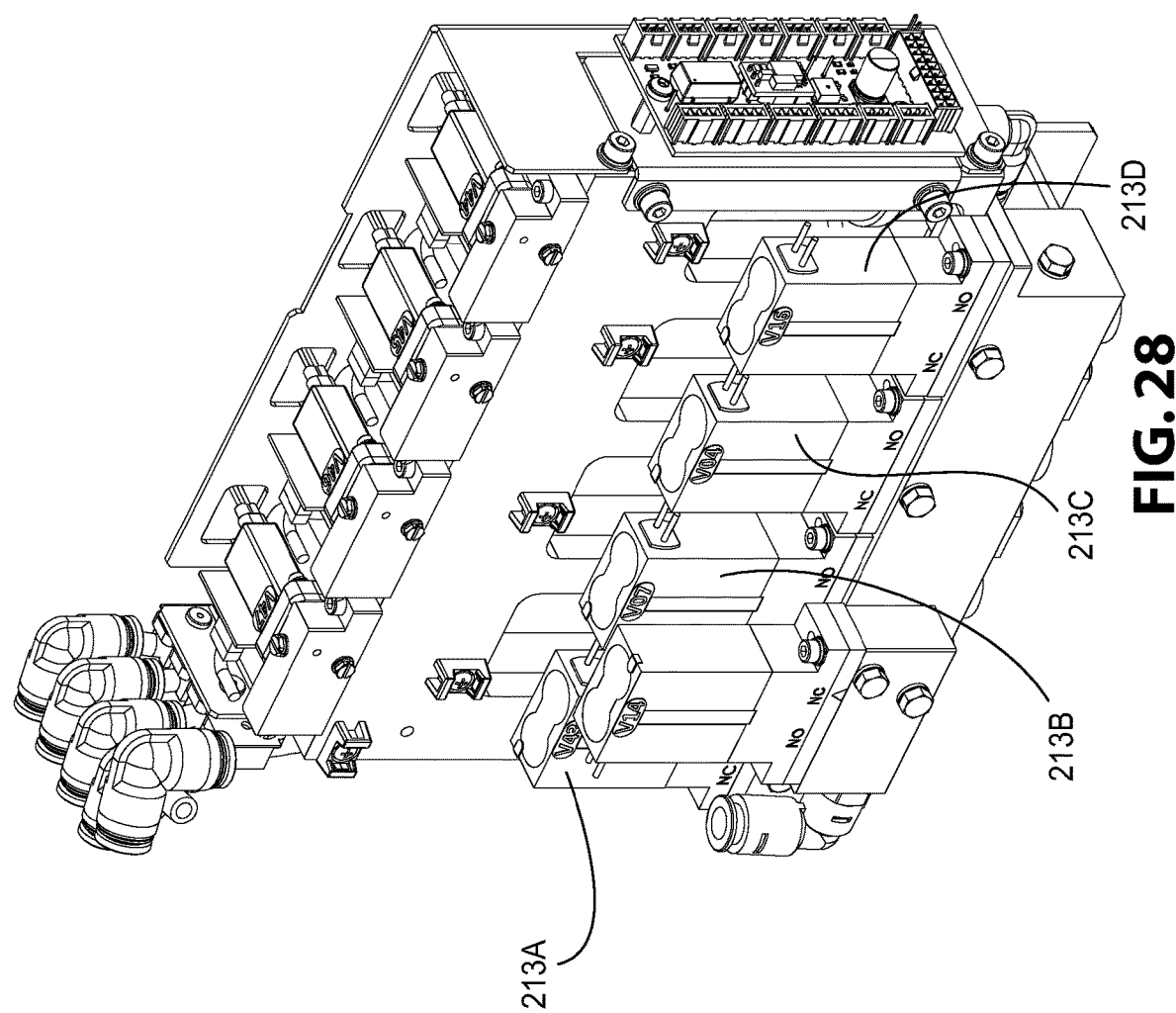
FIG. 28 is a rear perspective view of the apparatus illustrated in FIG. 27.
Figure 29:
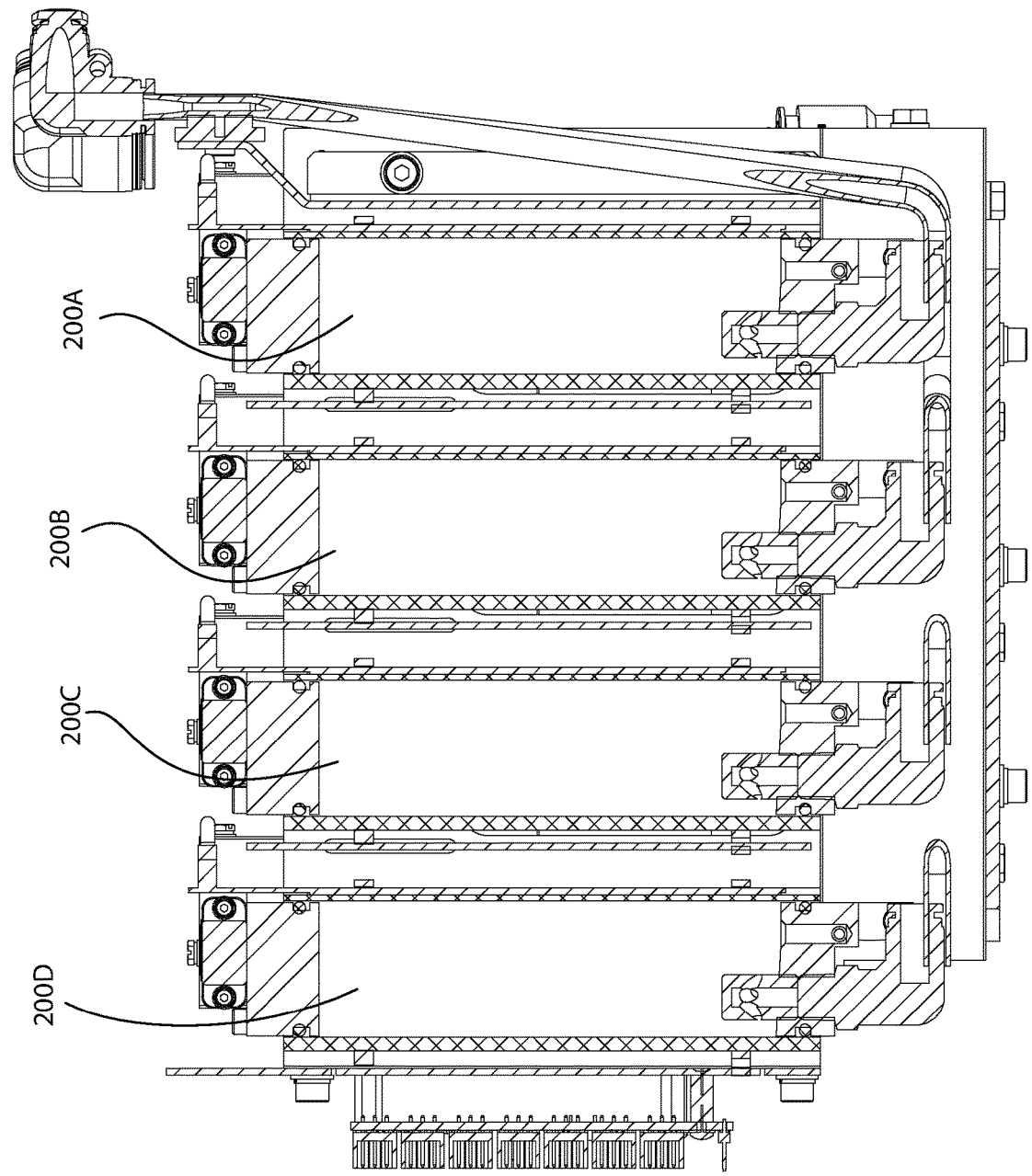
FIG. 29 is a section view along lines 28-28 in FIG. 27.

The hardware for achieving this task is illustrated in FIGS. 27-29 wherein four separate containers 200A-200D are illustrated. QAs shown in FIG. 29, external sensors 213A-213D, each made up of two spaced apart electrically insulated electrodes (not shown) are associated with containers 200A-200D to detect the level of waste fluid in each container 200A-200D.

Figure 30:
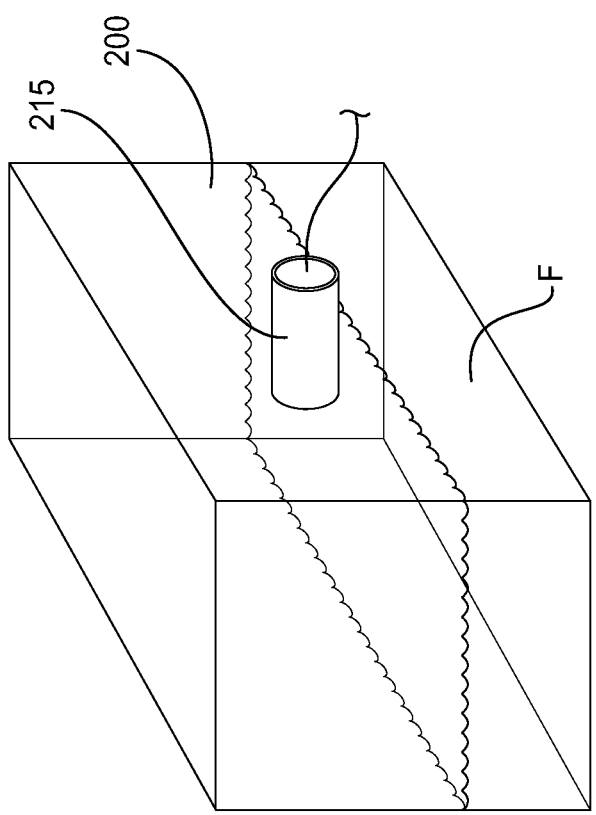
FIG. 30 is a schematic of a liquid measuring technique utilizing an ultrasonic sensor.
Figure 32:
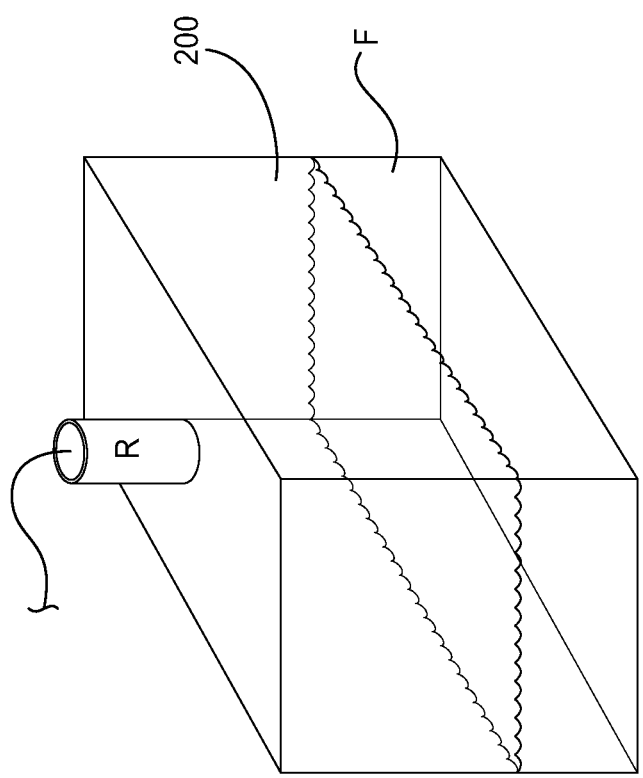
FIG. 32 is a schematic of a measurement technique using a radar sensor.

FIG. 30 illustrates a use of an ultra sound sensor 215 which placed upon the side of the container senses when the fluid F reaches a predetermined height at which time the process may be terminated. Such sensors are well known to one skilled in the art. It is also possible to position the sensor 215 at the bottom or at the top of the container such that the sound waves of the sensor will travel upward or downward to the boundary of the fluid. In this fashion, the height of fluid in the container may be determined.

Figure 3:
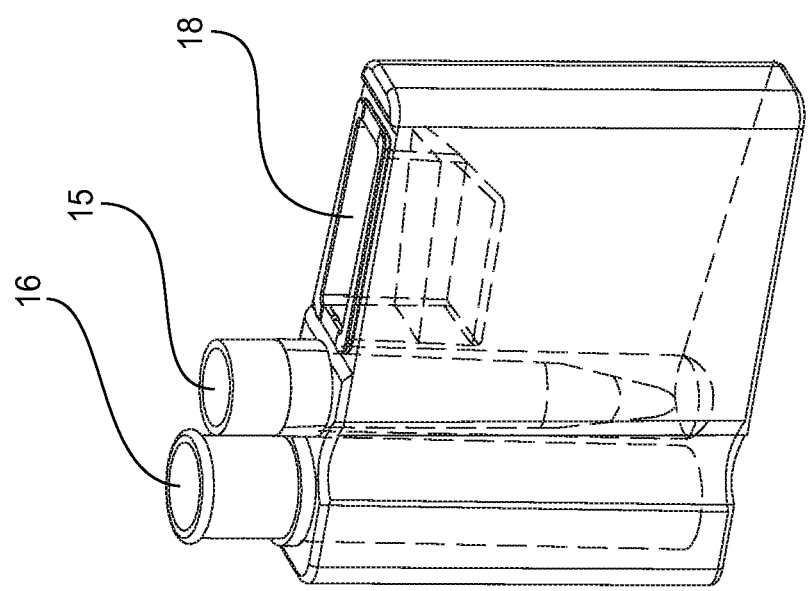
FIG. 3 illustrates a prior art cartridge containing a sample supply container and a couvette, therein.
Figure 31:
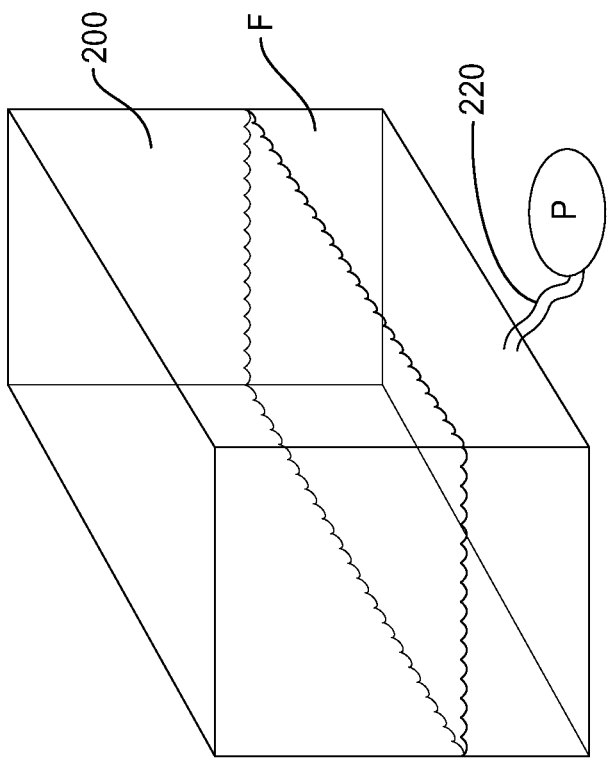
FIG. 31 is a schematic of a measurement technique utilizing a pressure sensor.

FIG. 31 illustrates an arrangement whereby the pressure of the Fluid F within the container 200 may be measured with the knowledge that as the liquid level increases, the water pressure at a predetermined submerged point increases. As illustrated in FIG. 3, a tube 220 penetrates the side of the container 200 such that at Liquid L the pressure may be measured by a pressure sensor P. In this fashion, it is possible that at a predetermined pressure, the rinsing process will terminate. It is also possible to introduce a membrane between the sensor and the vessel to sense pressure placed on the membrane by the fluid.

Figure 4:
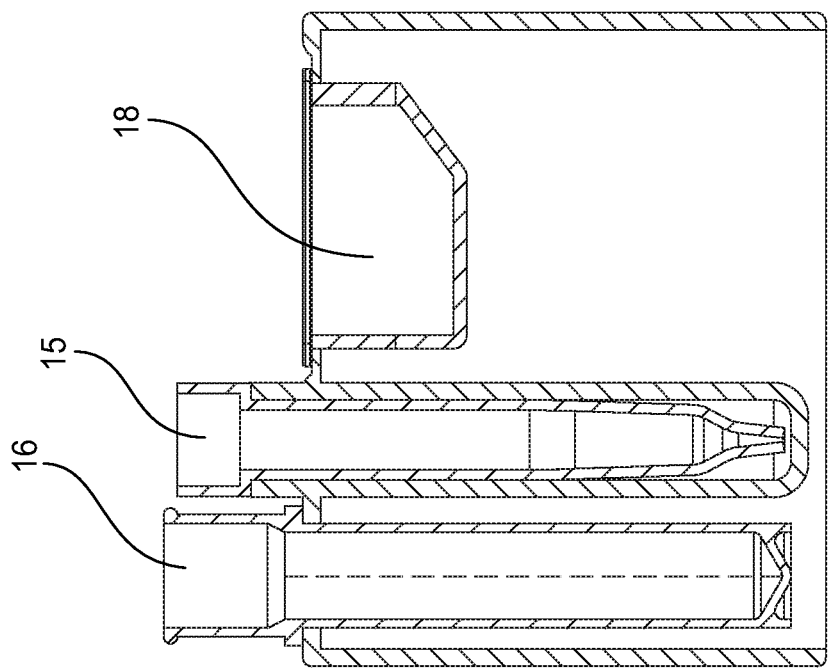
FIG. 4 shows a cross section of the prior art cartridge in FIG. 3.

FIG. 4 illustrates yet another technique for measuring the fluid F. In particular, a radar sensor R may be placed at the top of the container 200 and by measuring the distance between the radar sensor R and the top of the fluid F, the fluid level may be determined such that, once again, at a predetermined level, the rinsing process may be terminated.

While certain embodiments of the invention are shown in the accompanying figures and described herein above in detail, other embodiments will be apparent to and readily made by those skilled in the art without departing from the scope and spirit of the invention. For example, it is to be understood that this disclosure contemplates that to the extent possible one or more features of any embodiment can be combined with one or more features of the other embodiment. Accordingly, the foregoing description is intended to be illustrative rather than descriptive.

The invention claimed is:

1. A system for processing a biological sample for optical analysis comprising:

a) a plurality of cartridges, wherein each cartridge has a sample supply container for receiving a fluid/particle mixture and each cartridge has a couvette for receiving particles filtered from the fluid/particle mixture;
   b) a cartridge magazine with receivers for holding the plurality of cartridges;
   c) a cassette fan having a plurality of slots extending therethrough with each slot adapted to hold a filter cassette, wherein the cassette fan is movable from a first position aligned with select cartridges to a second position away from the cartridges; and
   d) a cassette clamp positioned over the cassette fan adapted to secure each filter cassette within the fan and to operate the filter cassette.

2. The system according to claim 1, further including a plurality of filter cassettes, wherein each filter cassette has an inlet for receiving a fluid/particle mixture from a sample supply container in one cartridge, an arrangement to filter the particles from the fluid, and an outlet for discharging the filtered particles into a couvette in the same cartridge.

3. The system according to claim 2, wherein each filter cassette has a slide valve for executing the multi-step filtering process within each filter cassette.

4. The system according to claim 3, further including a motor mounted on the cassette clamp to operate slide valves of filter cassettes mounted therein.

5. The system according to claim 2, wherein the cassette fan in a first position has filter cassettes therein and wherein for each filter cassette the inlet is aligned with the sample supply container of a cartridge and the outlet is aligned with the couvette of the same cartridge.

6. The system according to claim 5, wherein in a clamp first position the cassette clamp is secured against each filter cassette to secure the filter cassette within the cassette fan.

7. The system according to claim 6, wherein the cassette clamp is fluidly connected to control ports of each filter cassette such that in the clamp first position the filter cassettes are operated to filter the fluid/particle mixture.

8. The system according to claim 7, wherein rinse fluid is used to rinse the filter in the filter cassette and further including a measuring device for measuring the amount of rinse fluid used and discontinuing the rinse cycle when a predetermined amount of rinse fluid has been used.

9. The system according to claim 8, wherein the measurement device is selected from one of a capacitive liquid sensor, an ultrasonic sensor, and a water pressure sensor.

10. The system according to claim 2, wherein the cassette fan in a second position has filter cassettes therein in a loading/unloading region away from the cartridge magazine.

11. The system according to claim 10, further including a filter cassette supply magazine to provide an inventory of unused filter cassettes on a mechanical arm that transfers unused filter cassettes to vacant slots in the cassette fan and a filter cassette depository magazine to provide a depository for used filter cassettes and wherein the mechanical arm is adapted to transfer used filter cassettes from the cassette fan to the filter cassette depository magazine.

12. The system according to claim 1, wherein the cassette fan and the cartridge magazine move independent of one another so that the cassette fan may be indexed to certain positions relative to the cartridge magazine.

13. The system according to claim 12, wherein the cassette fan and the cartridge magazine rotate about a common axis.

14. The system according to claim 1, wherein the number of receivers in the cartridge magazine is greater than the number of slots in the cassette fan.

15. A method for processing a biological sample for optical analysis comprising the steps of:
   a) holding a plurality of cartridges within receivers of a cartridge magazine, wherein each cartridge has a sample supply container for receiving a fluid/particle mixture and each cartridge has a couvette for receiving particles filtered from the fluid/particle mixture;
   b) with a cassette fan having a plurality of slots extending therethrough with each slot adapted to hold a filter cassette, moving the cassette fan to a first position aligned with select cartridges in the magazine; and
   c) positioning a cassette clamp over the cassette fan and securing with the cassette clamp each filter cassette within the fan and operating the filter cassette.

16. The method according to claim 15 further including the step, after positioning the cassette clamp to secure the cassette and operating the filter cassette, of releasing each used filter cassette and moving the cassette fan to a second position away from the magazine for unloading used filter cassettes and reloading new filter cassettes within the cassette fan.

17. The system according to claim 1, further comprising a filter element within each filter cassette and an apparatus for rinsing undersize particles through an upper surface of each filter element having:
   a) a source of rinse fluid for providing rinse fluid through the upper surface of the filter element to displace undersize particles through the filter element; wherein thereafter the used rinse fluid becomes waste fluid;
   b) a vessel in fluid connection with the filter element for collecting the waste fluid;
   c) a measuring device for measuring the amount of waste fluid in the vessel and upon reaching a predetermined amount of waste fluid, discontinuing the rinsing; and
   d) a source of elution fluid in fluid communication with the upper surface of the filter element for tangentially wiping particles from the filter.

18. The apparatus in accordance with claim 17, wherein the measurement device is one from a capacitive liquid sensor, an ultrasonic sensor, and a water pressure sensor.

19. The method according to claim 15 wherein each filter cassette has a filter element and the method further comprising the steps of:
   a) depositing particles upon an upper surface of the filter element;
   b) providing rinse fluid through the upper surface of the filter element to displace undersize particles through the filter element; wherein thereafter the used rinse fluid becomes waste fluid;
   c) collecting the waste fluid in a vessel;
   d) measuring the amount of waste fluid in the vessel and upon reaching a predetermined amount of waste fluid, discontinuing the rinsing; and
   e) if the amount of waste fluid in the vessel is less than the predetermined amount of waste fluid, then repeat steps b) d).

20. The method according to claim 19 further including the step of, after the amount of waste fluid equals or exceeds the predetermined amount, tangentially wiping an upper surface of the filter element with an elution fluid to displace the deposited particles.

* * * * *

UNITED STATES PATENT AND TRADEMARK OFFICE
CERTIFICATE OF CORRECTION

PATENT NO. : 10,739,237 B2
APPLICATION NO. : 16/052969
DATED : August 11, 2020
INVENTOR(S) : Gal Ingber Page 1 of 1

It is certified that error appears in the above-identified patent and that said Letters Patent is hereby corrected as shown below:

In the Claims

Column 12, Line 25, Claim 19, delete "b) d)." and insert -- b)-d). --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*